United States Patent
Kraus

(10) Patent No.: US 10,426,097 B2
(45) Date of Patent: *Oct. 1, 2019

(54) AGRICULTURAL BALER WITH STARTUP MODE

(71) Applicant: Deere & Company, Moline, IL (US)

(72) Inventor: Timothy J. Kraus, Blakesburg, IA (US)

(73) Assignee: DEERE & COMPANY, Moline, IL (US)

(*) Notice: Subject to any disclaimer, the term of this patent is extended or adjusted under 35 U.S.C. 154(b) by 241 days.

This patent is subject to a terminal disclaimer.

(21) Appl. No.: 15/291,588

(22) Filed: Oct. 12, 2016

(65) Prior Publication Data

US 2018/0098506 A1    Apr. 12, 2018

(51) Int. Cl.
*A01F 15/08* (2006.01)
*A01F 15/04* (2006.01)
*B30B 9/30* (2006.01)

(52) U.S. Cl.
CPC ........ *A01F 15/0841* (2013.01); *A01F 15/042* (2013.01); *B30B 9/306* (2013.01); *B30B 9/3057* (2013.01)

(58) Field of Classification Search
CPC .. A01F 15/0841; A01F 15/042; B30B 9/3057; B30B 9/306
USPC ........................................................ 100/179
See application file for complete search history.

(56) References Cited

U.S. PATENT DOCUMENTS

| | | | |
|---|---|---|---|
| 4,168,659 A | 9/1979 | Yatcilla et al. | |
| 4,280,403 A | 7/1981 | Alderson | |
| 4,624,180 A | 11/1986 | Strosser | |
| 4,627,341 A | 12/1986 | Sudbrack et al. | |
| 4,756,244 A | 7/1988 | Strosser | |
| 6,257,131 B1 | 7/2001 | Wilkens et al. | |
| 6,651,416 B2 | 11/2003 | Trelstad et al. | |
| 7,047,719 B2 | 5/2006 | Dubois | |
| 2005/0235841 A1* | 10/2005 | Hel | A01F 15/042 100/43 |

(Continued)

FOREIGN PATENT DOCUMENTS

| | | |
|---|---|---|
| DE | 3809131 C1 | 5/1989 |
| DE | 3941092 C1 | 12/1990 |

(Continued)

OTHER PUBLICATIONS

English machine translation (DE19913030A1) from Espacenet, retrieved on Sep. 7, 2018.*

(Continued)

*Primary Examiner* — Shelley M Self
*Assistant Examiner* — Mohammed S. Alwadi

(57) ABSTRACT

An agricultural harvesting machine for crop material including a crank arm connected to a rotational power source, a plunger having an extended position which is located further rearward in a compression chamber than a retracted position, and a connecting link connected between the crank arm and the plunger. The movement plunger is decoupled from the movement of the crank arm during a startup mode of the agricultural harvesting machine. The movement plunger is coupled to the movement of the crank arm during a run mode of the agricultural harvesting machine. The connecting link, crank arm, or both have a variable length.

20 Claims, 22 Drawing Sheets

(56) References Cited

U.S. PATENT DOCUMENTS

2014/0090568 A1    4/2014   Missotten et al.
2014/0165859 A1    6/2014   O'Reilly et al.
2015/0342120 A1   12/2015   O'Reilly
2016/0113206 A1    4/2016   Kraus

FOREIGN PATENT DOCUMENTS

DE    19644574 A1    4/1998
DE    19913030 A1    9/2000
EP     0951988 A2   10/1999

OTHER PUBLICATIONS

European Search Report issued in counterpart application No. 17195955.4 dated Feb. 26, 2018. (6 pages).

\* cited by examiner

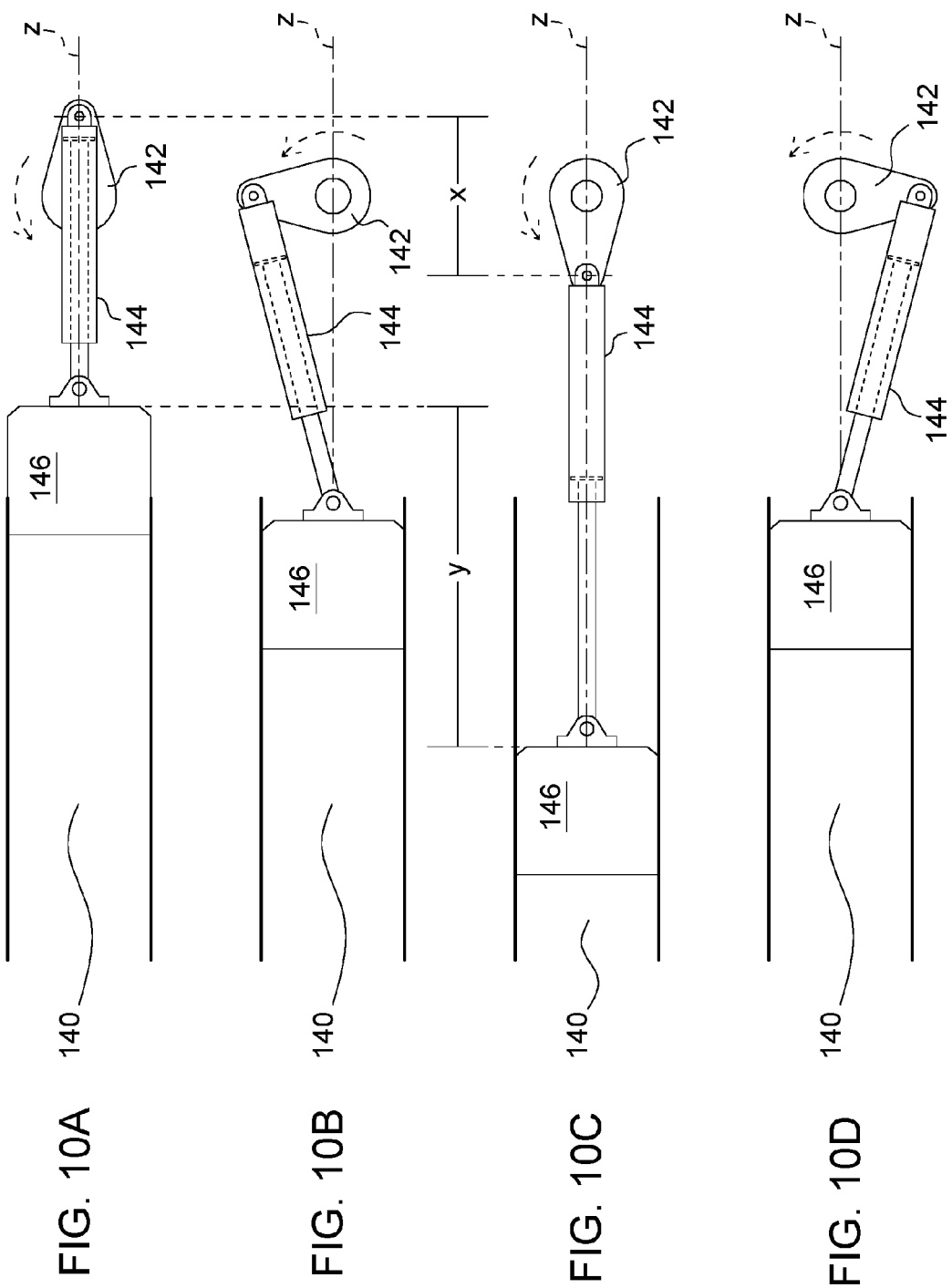

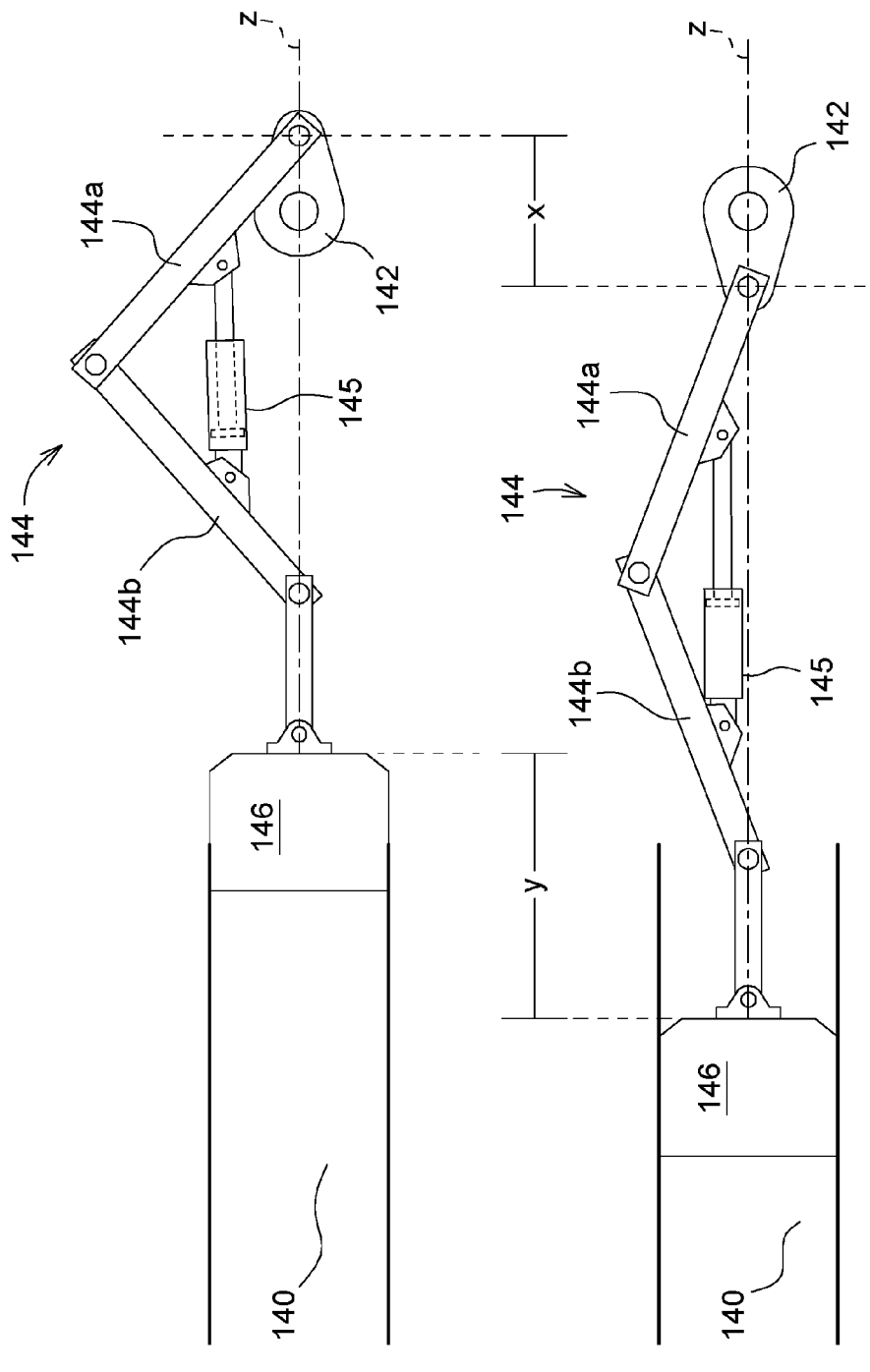

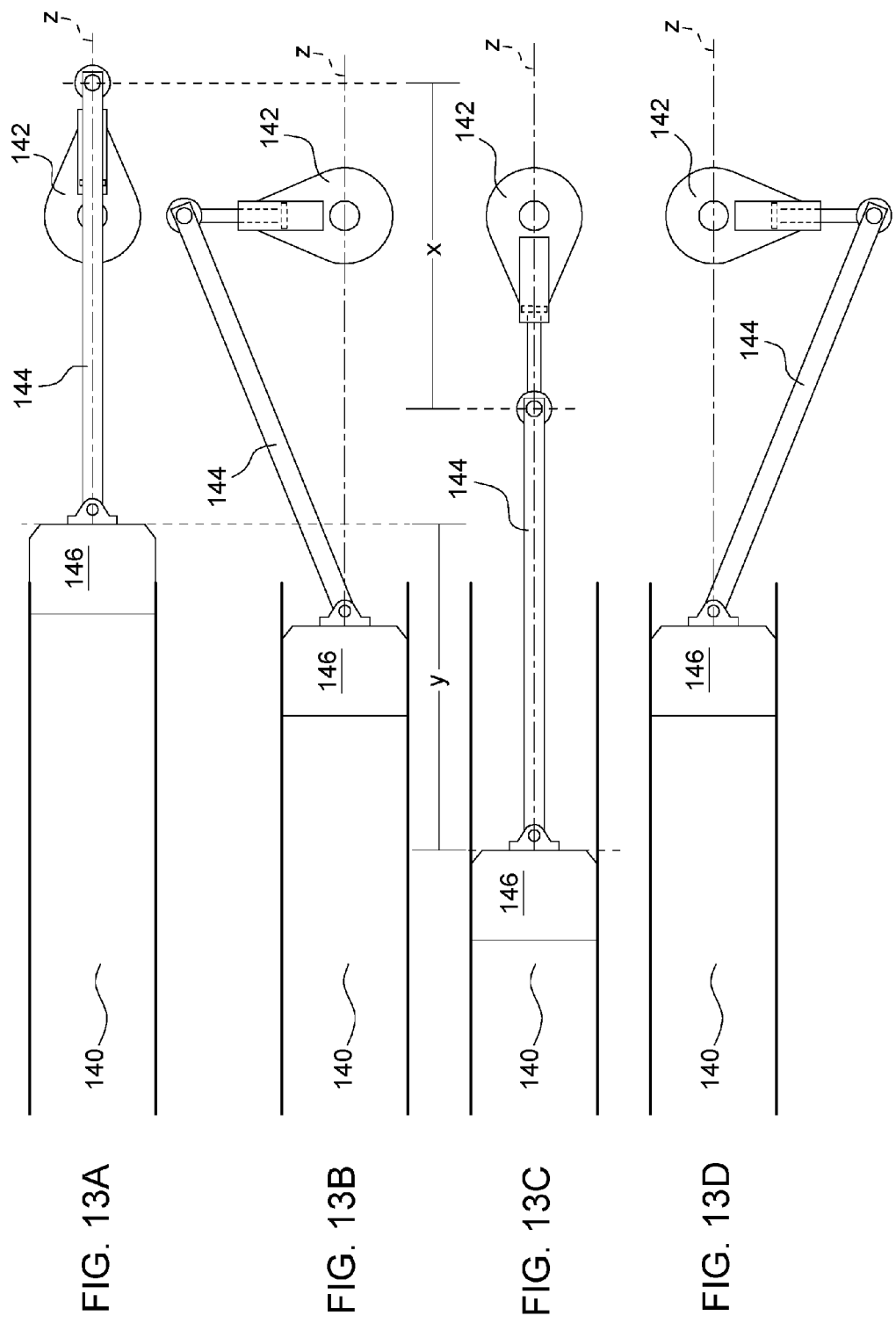

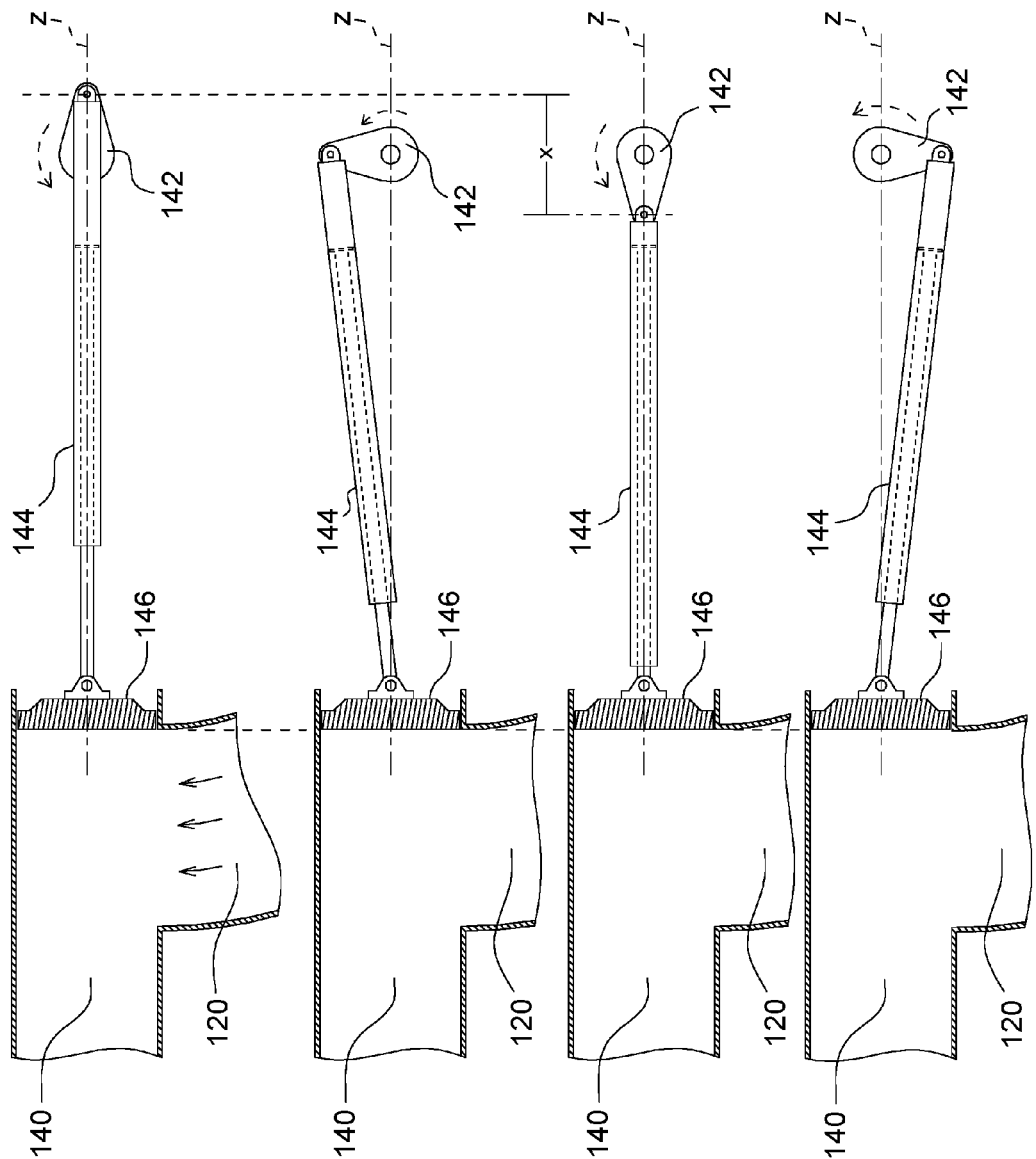

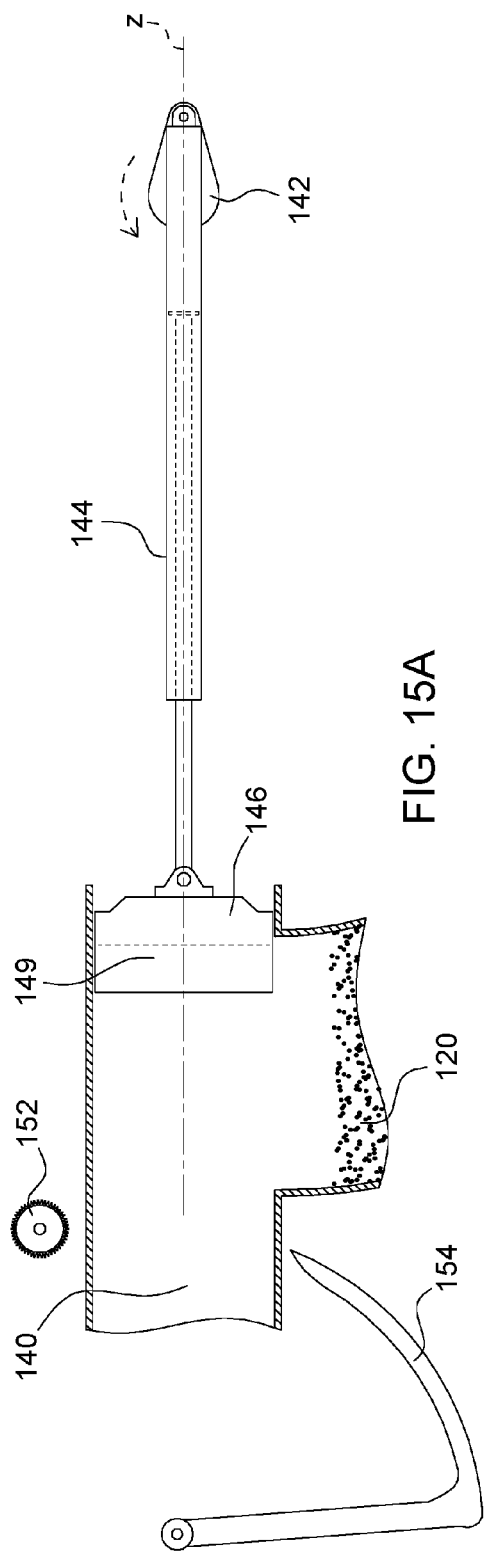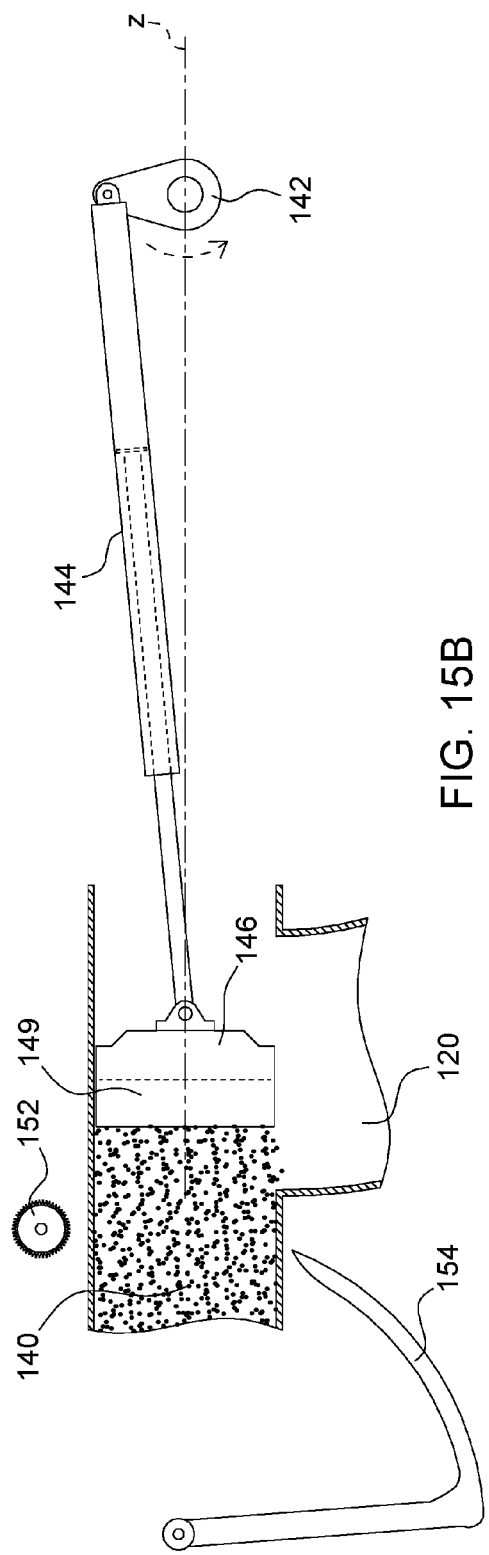

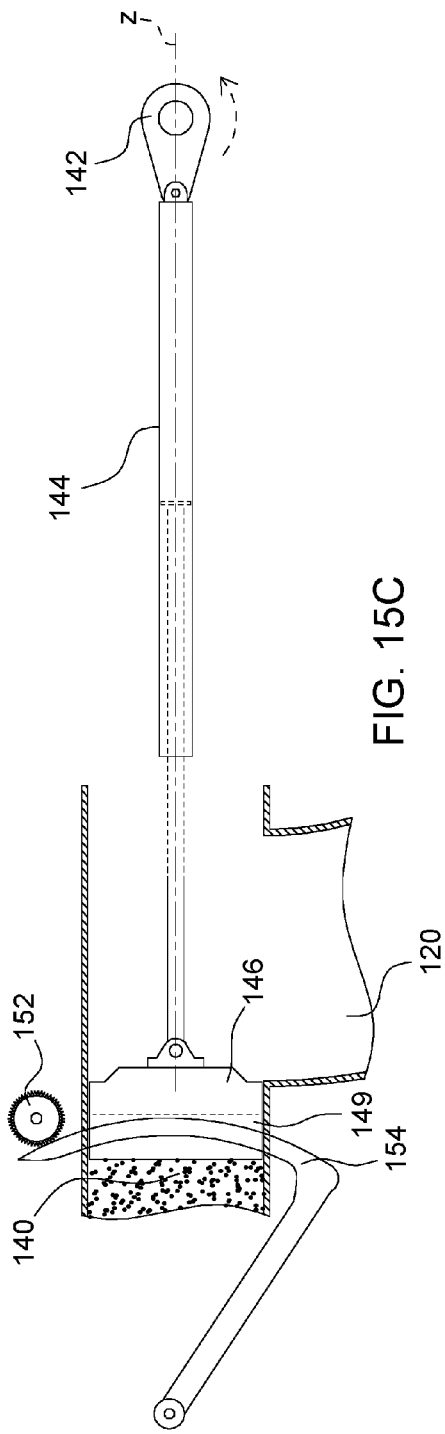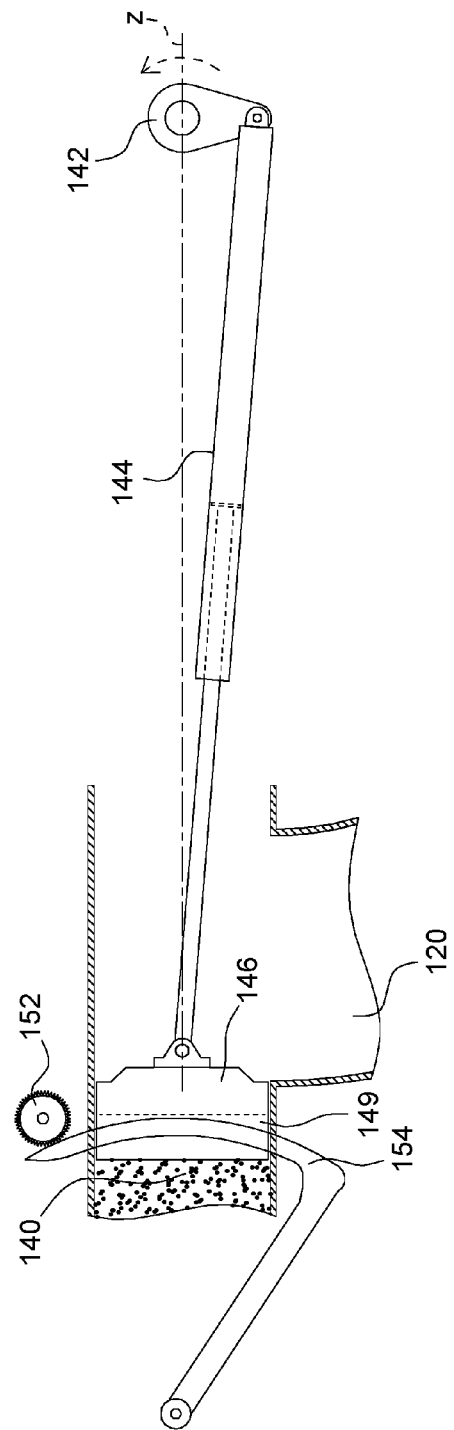

AGRICULTURAL BALER WITH STARTUP MODE

CROSS-REFERENCE TO RELATED APPLICATIONS

N/A

FIELD OF THE DISCLOSURE

The present disclosure relates to agricultural harvesting machines having a plunger for compressing crop material into a crop package.

BACKGROUND

Agricultural balers gather, compress, and shape crop material into a bale. There are different types of balers which create rectangular or square bales or cylindrical or round bales. Bales can be bound with netting, strapping, wire, or twine. A baler that produces small rectangular bales is often referred to as a square baler. Another type of baler is one that produces large rectangular bales, often referred to as large square baler.

Large square balers have been used in crop harvesting for many years. One advantage over other types of balers is that they densify the crop into large rectangular shaped bales, which can minimize shipping and storage costs. Large square balers usually utilize a compression system including a gearbox with a fixed length crank arm and a fixed length connecting rod which is attached to a plunger. During each rotation of the crank arm, the plunger compresses the crop in a baling chamber by extruding the crop though a rectangular chute as the plunger moves towards the rear of the baler. Crop is usually metered from a pre-compression chamber into the baler chamber. One purpose for having a pre-compression chamber is to collect enough crop material to make a full flake of hay prior to moving the crop in front of the plunger to be compressed.

One of the problems with a fixed length connecting rod is that a large amount of torque is required to get the flywheel, driveline components, gearbox components, and plunger to begin moving during startup of the baler. This problem is aggravated for balers that are capable of producing high density bales because these balers incorporate excessively large flywheels, more massive plungers, and heavier driveline components. This is also a problem when starting up a baler after it is plugged because the tractor must not only overcome the torque to get the components moving, but it also must overcome the additional torque that occurs as the plunger compresses crop that resides in the bale chamber.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a system which reduces the amount of torque required during the startup of a baler.

According to an aspect of the present disclosure, an agricultural harvesting machine for crop material may include a crank arm connected to a rotational power source, a plunger having an extended position which is located further rearward in a compression chamber than a retracted position, and a connecting link connected between the plunger and the crank arm. The movement of the plunger is decoupled from the movement of the crank arm during a startup mode and the movement of the plunger is coupled to the movement of the crank arm during a run mode. The connecting link, the crank arm, or both can have a variable length.

During the startup mode, one of the connecting link and the crank arm may lengthen and shorten to a first plurality of different lengths to decouple the reciprocal motion of the plunger from the rotational motion of the crank arm.

During the operational or run mode, one of the connecting link and the crank arm may lengthen and shorten to a second plurality of different lengths to reciprocally move the plunger to the extended position and return the plunger to the retracted position as the crank arm rotates.

The agricultural harvesting machine may further include a controller configured to maintain the plunger in a substantially stationary position during a startup mode and to move the plunger between the retracted and extended positions during a run mode.

The agricultural harvesting machine may further include a controller configured to vary the length of one or more of the connecting link and the crank arm.

According to an aspect of the present disclosure, a method of compressing crop material in an agricultural harvesting machine may include one or more of the following processes or steps: decoupling the movement of a plunger from movement of a crank arm by varying the length of one of a connecting link and a crank arm based upon sensing a startup mode of the agricultural harvesting machine; and extending and retracting the plunger into and out of the compression chamber by varying the length of one of the connecting link and a crank arm to compress crop material based upon sensing a run mode of the agricultural harvesting machine.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIGS. 10A, 10B, 10C, and 10D are schematic side views of an agricultural harvesting machine, according to one embodiment;

FIGS. 11A and 11B are schematic side views of an agricultural harvesting machine, according to one embodiment;

FIGS. 13A, 13B, 13C, and 13D are schematic side views of an agricultural harvesting machine, according to one embodiment;

FIGS. 14A, 14B, 14C, and 14D are schematic side views of an agricultural harvesting machine, according to one embodiment;

FIGS. 15A, 15B, 15C, and 15D are schematic side views of an agricultural harvesting machine, according to one embodiment;

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
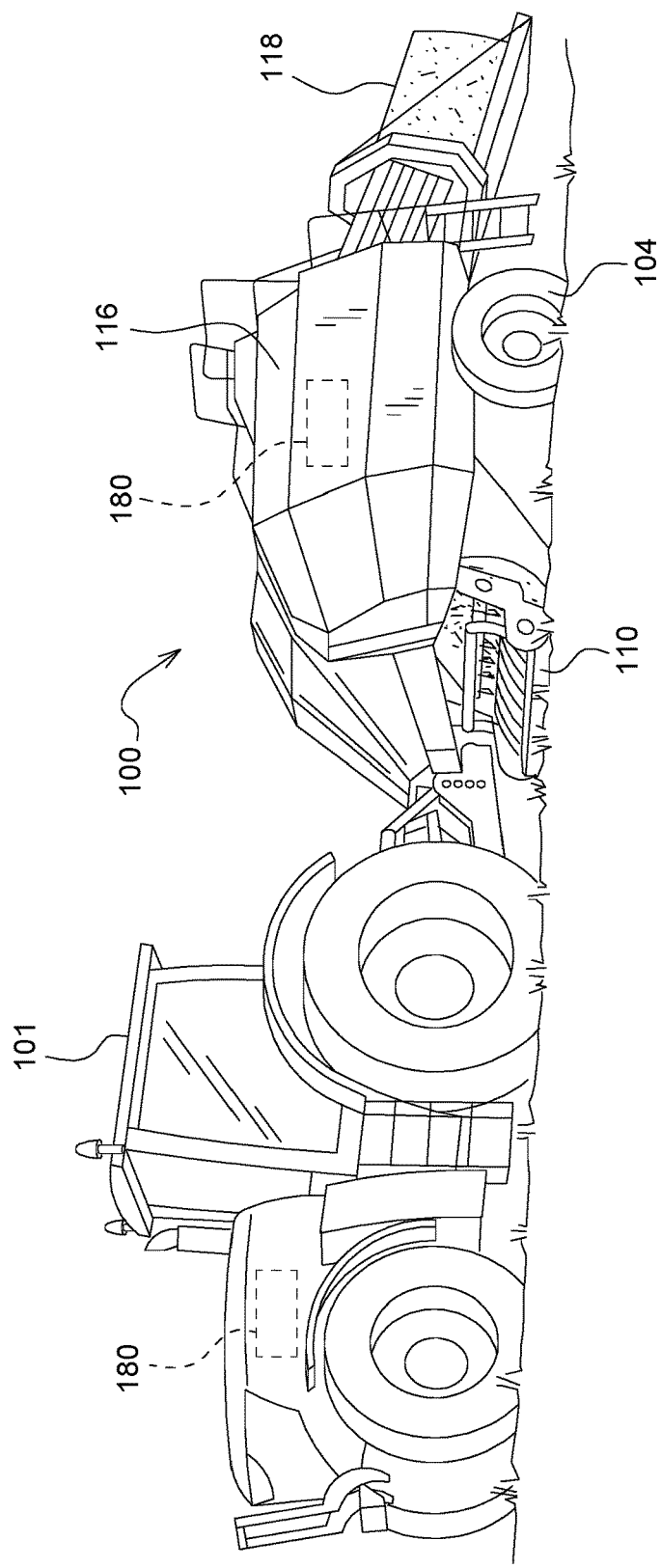
FIG. 1 is a perspective view of an agricultural harvesting machine coupled to an agricultural vehicle.
Figure 2:
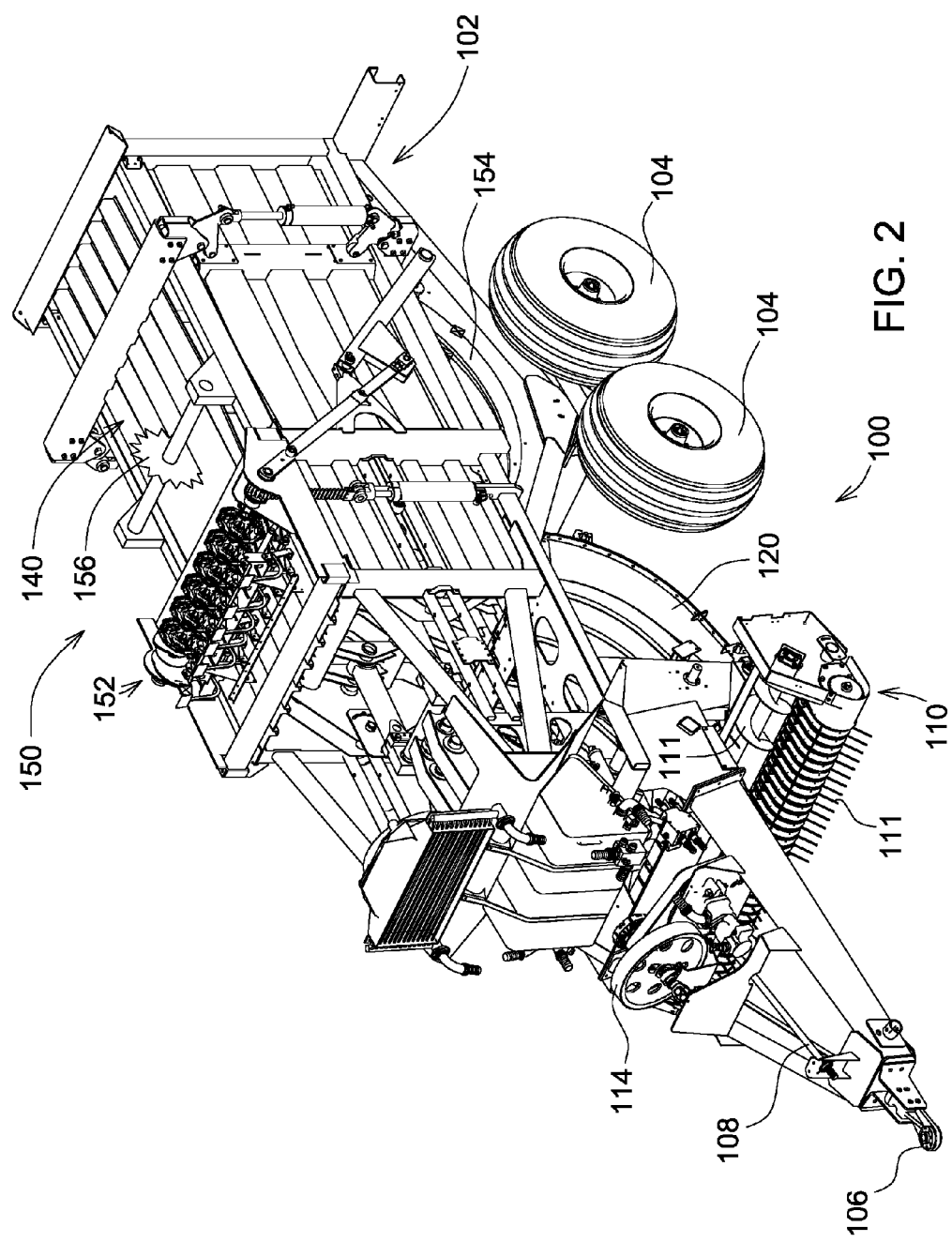
FIG. 2 is a front perspective view of an agricultural harvesting machine, according to one embodiment.
Figure 3:
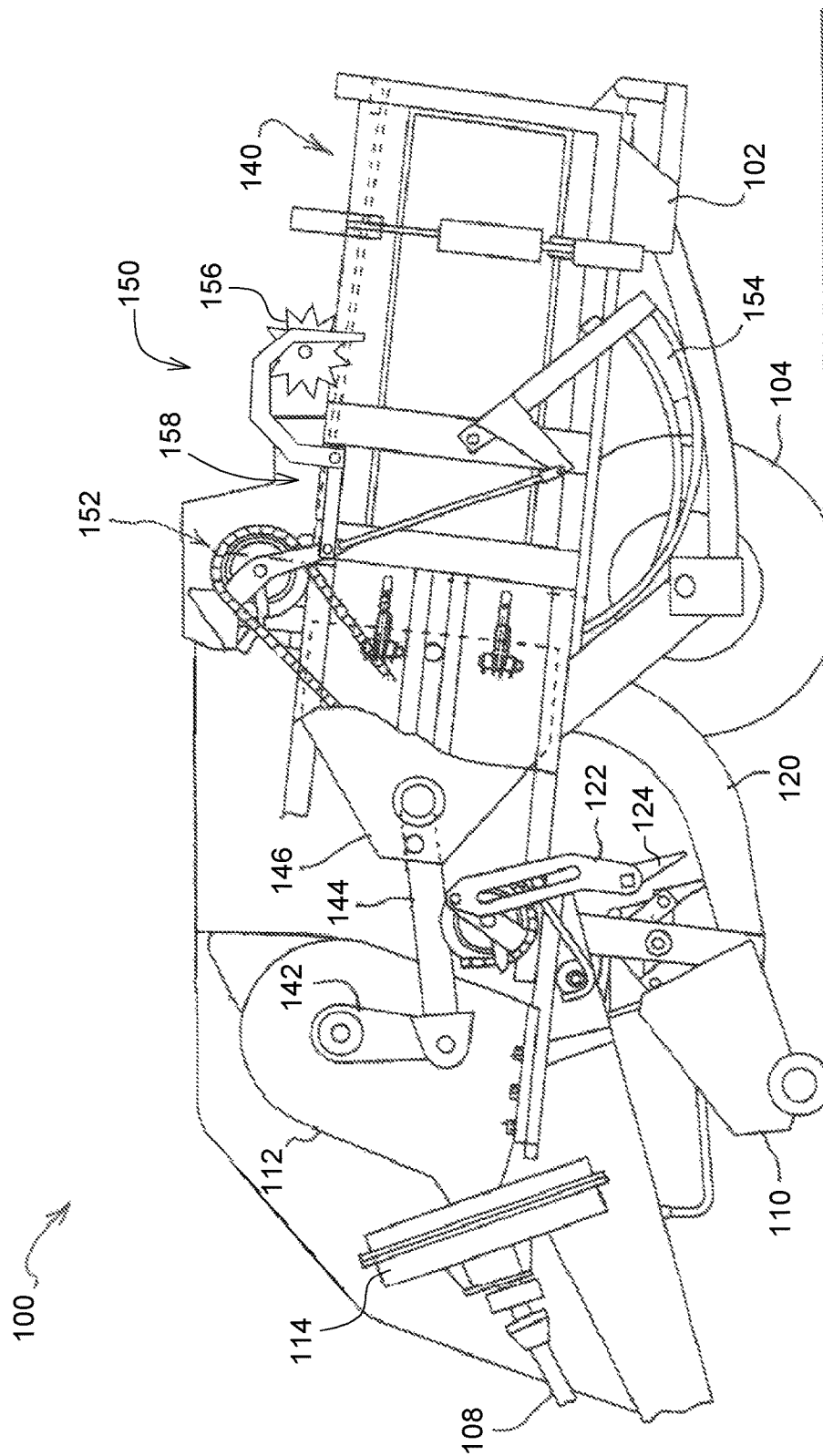
FIG. 3 is a schematic side view an agricultural harvesting machine, according to one embodiment.
Figure 4:
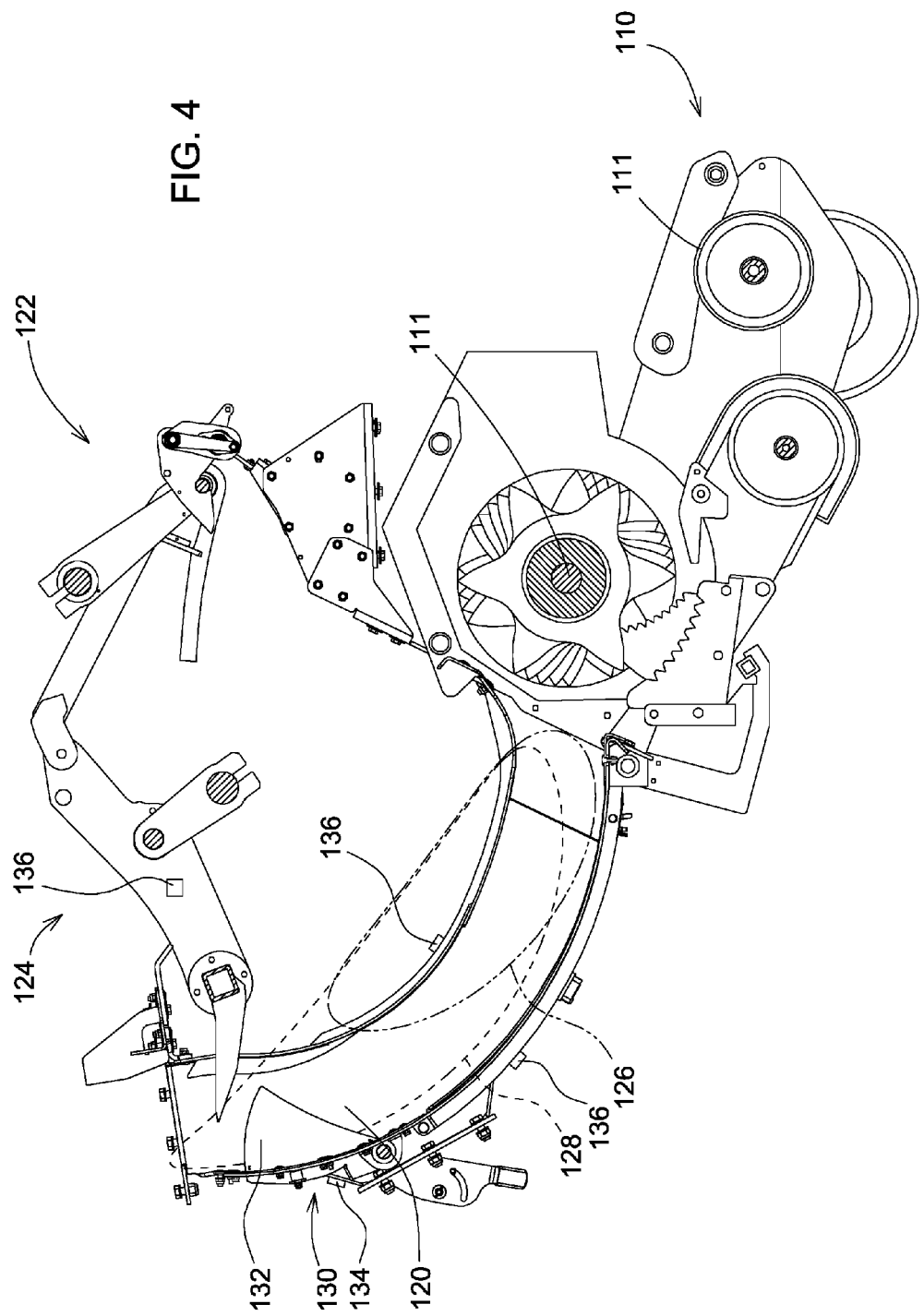
FIG. 4 is a side view of a portion of an agricultural harvesting machine, according to one embodiment.
Figure 5:
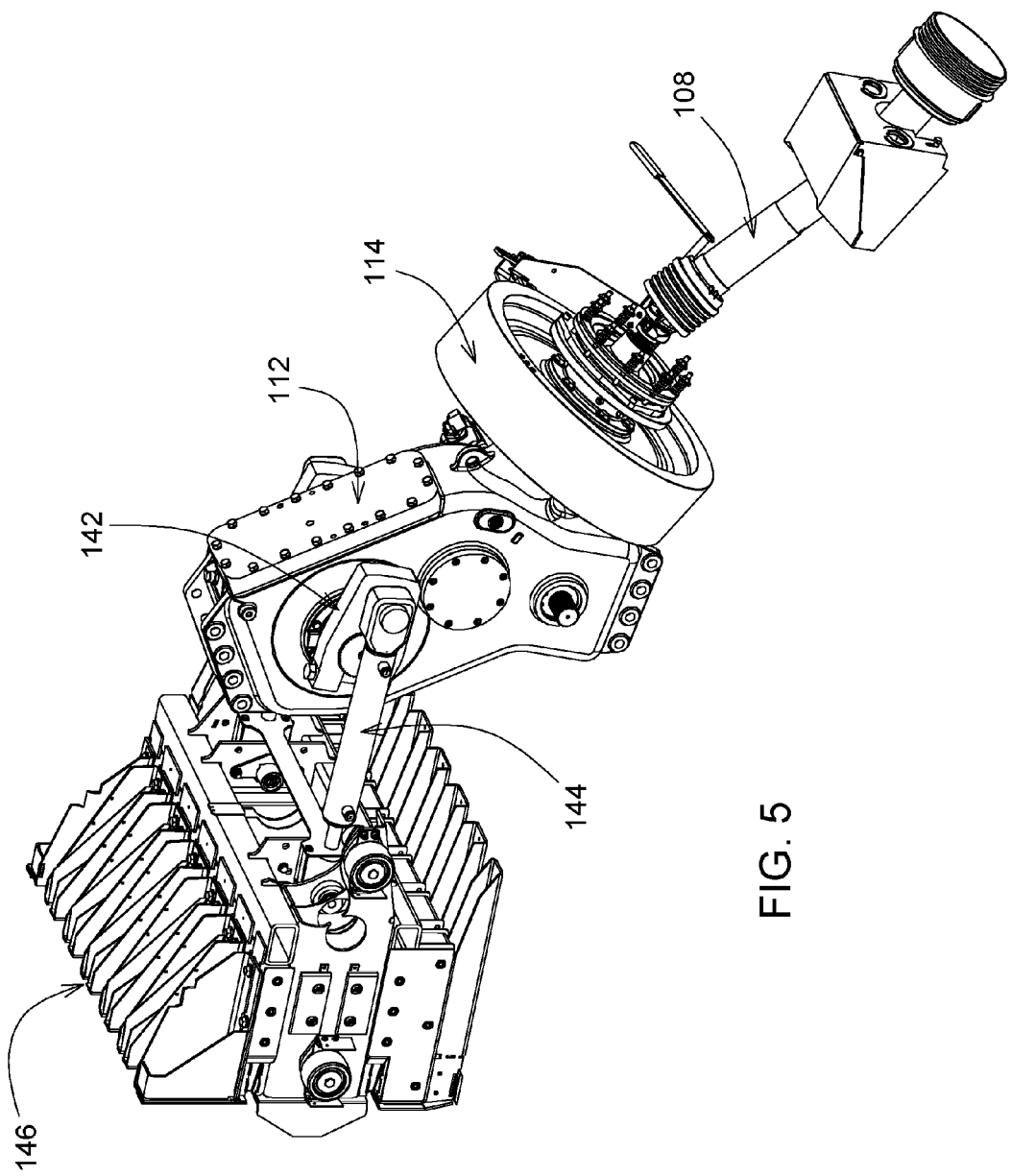
FIG. 5 is a perspective view of a portion of an agricultural harvesting machine, according to one embodiment.
Figure 6:
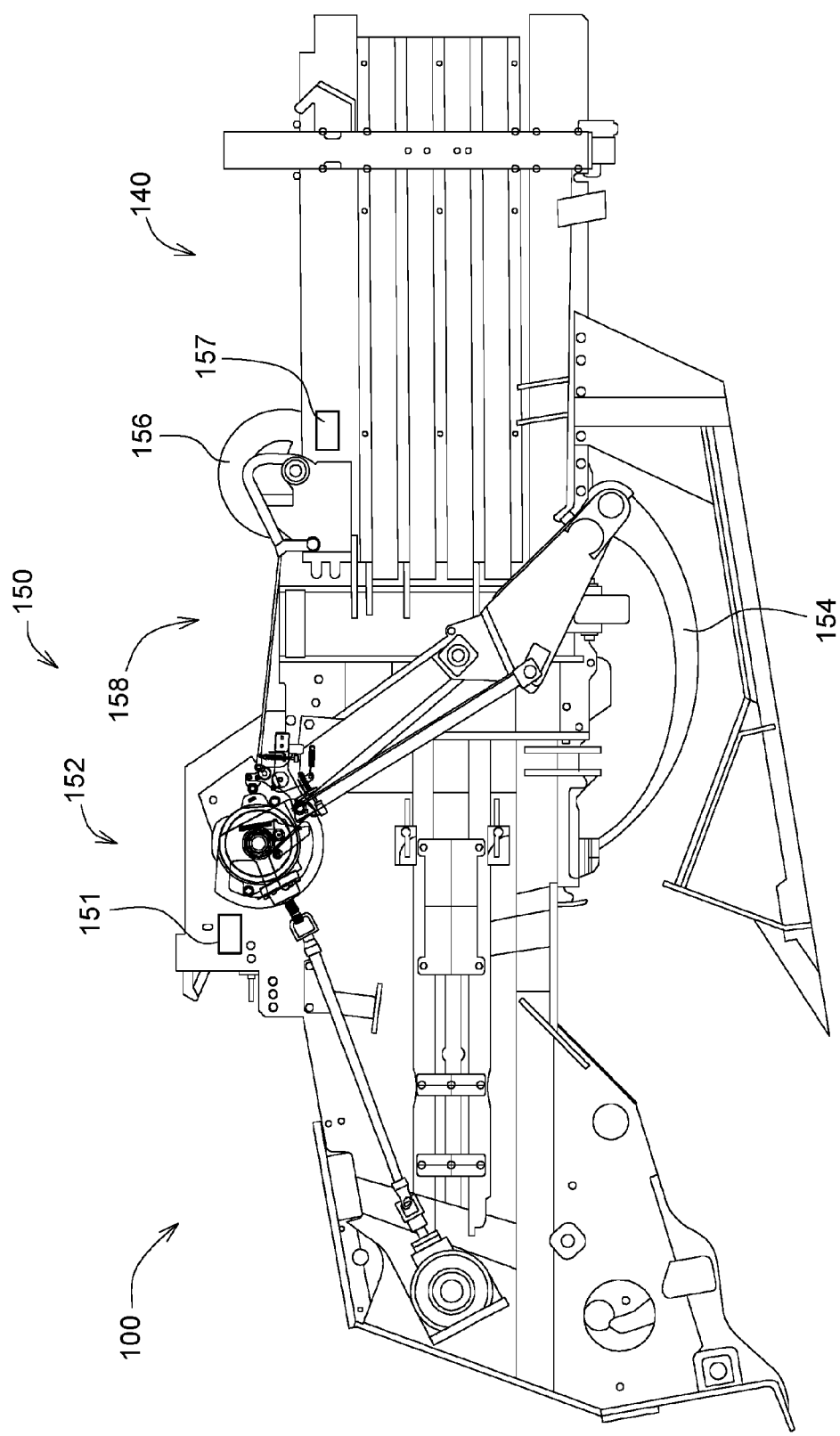
FIG. 6 is a side view of a portion of an agricultural harvesting machine, according to one embodiment.
Figure 6A:
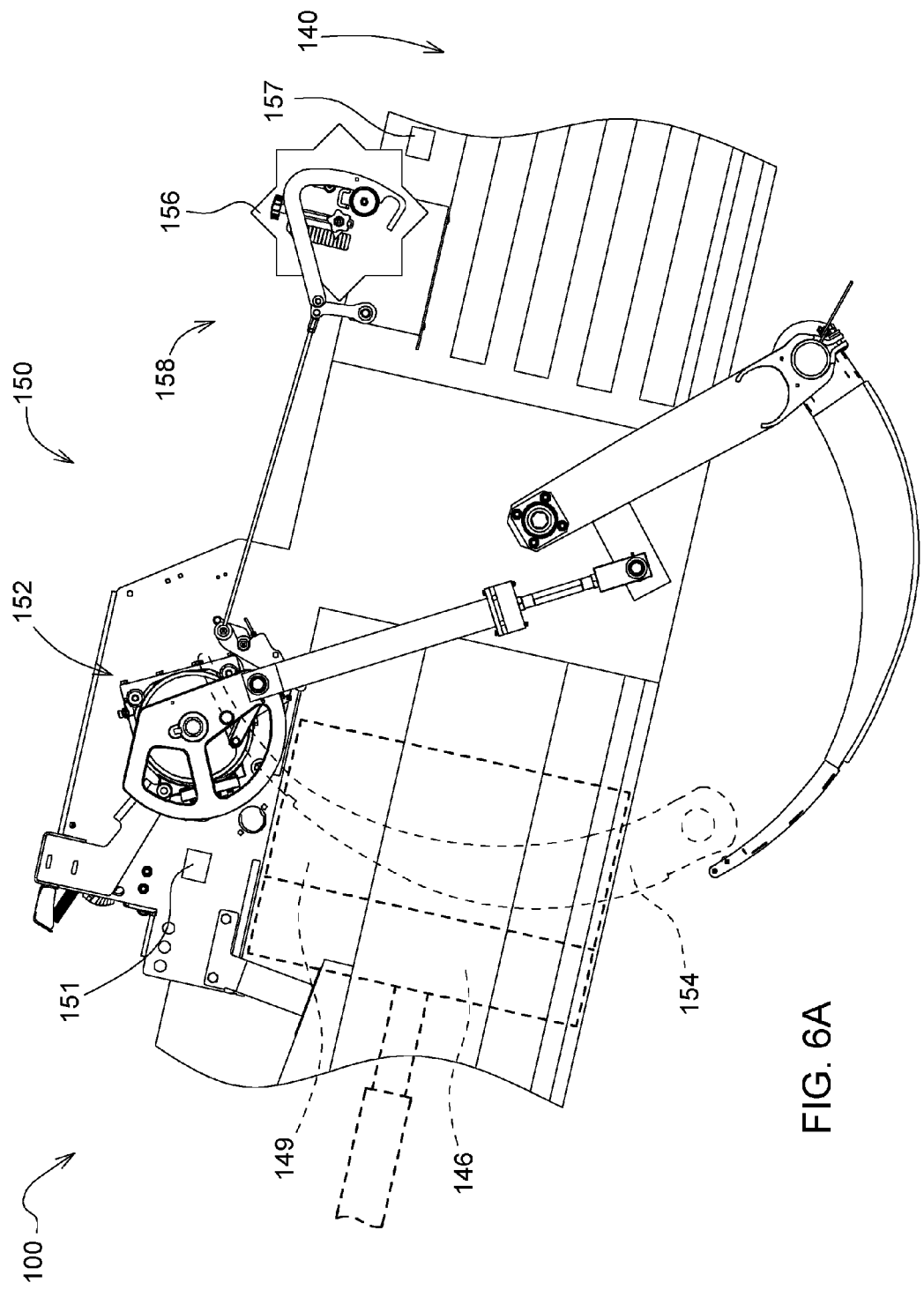
FIG. 6A is a side view of a portion of an agricultural harvesting machine, according to one embodiment.
Figure 7:
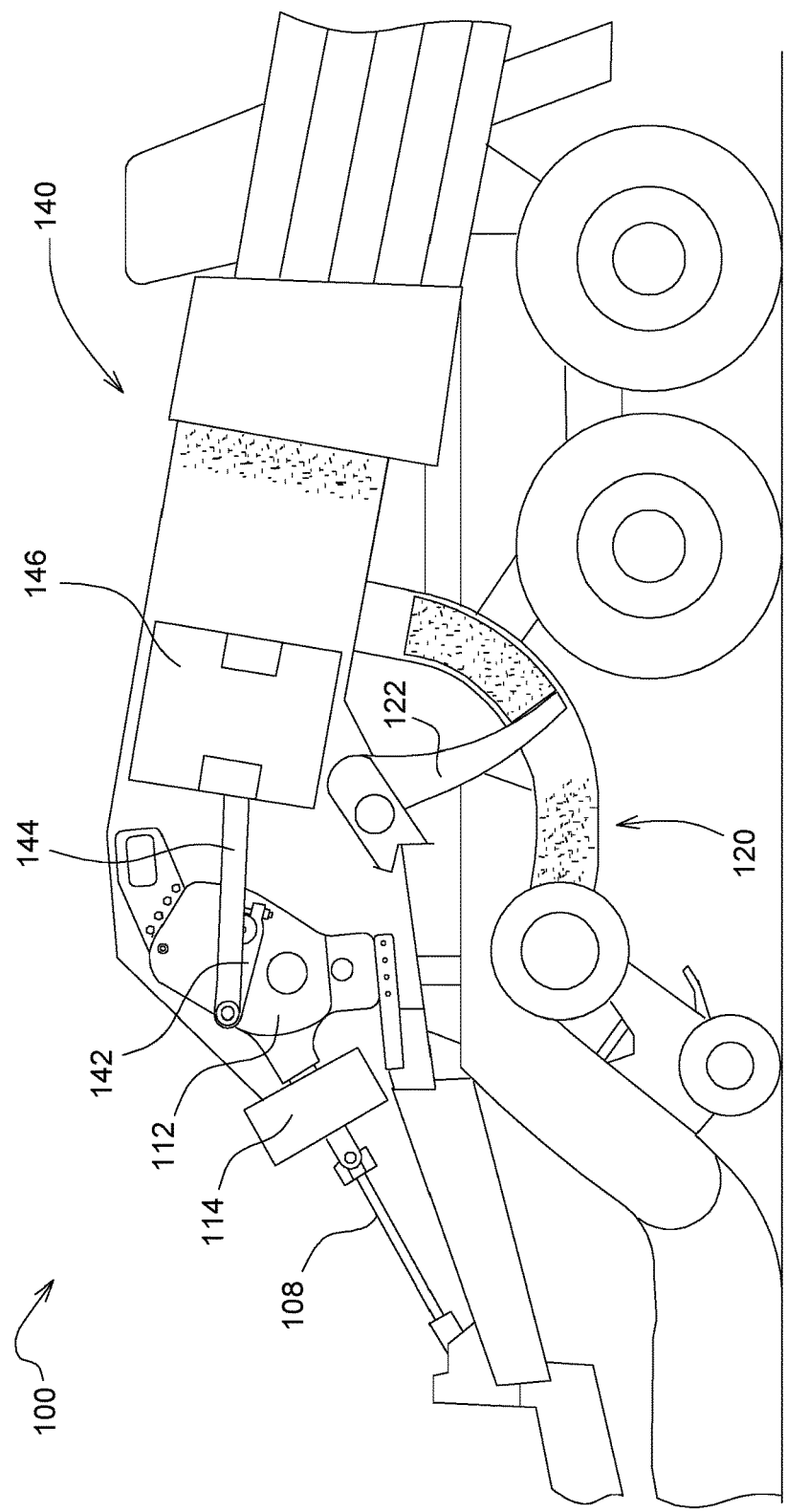
FIG. 7 is a schematic side view of an agricultural harvesting machine, according to one embodiment.
Figure 8:
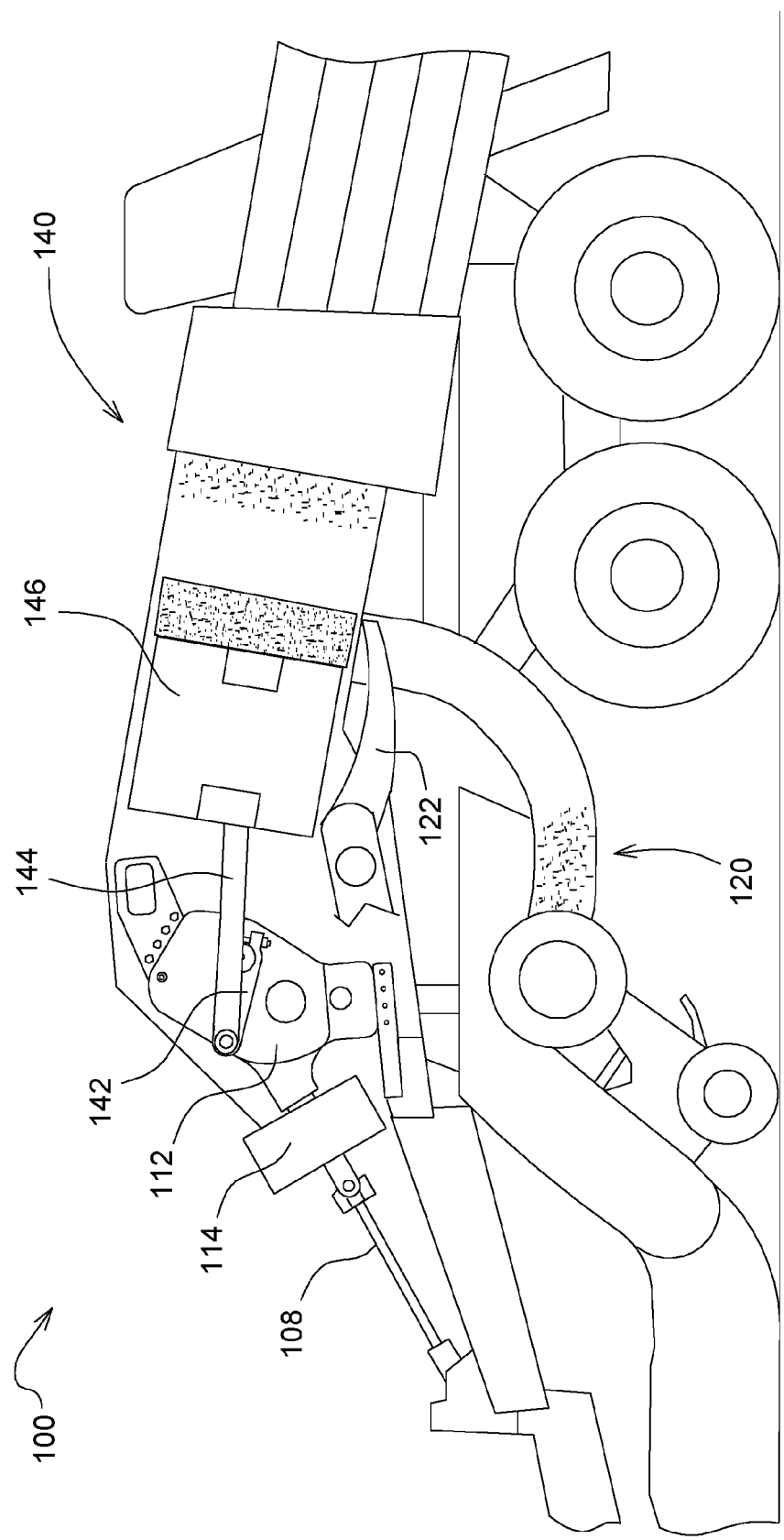
FIG. 8 is a schematic side view of an agricultural harvesting machine, according to one embodiment.
Figure 9:
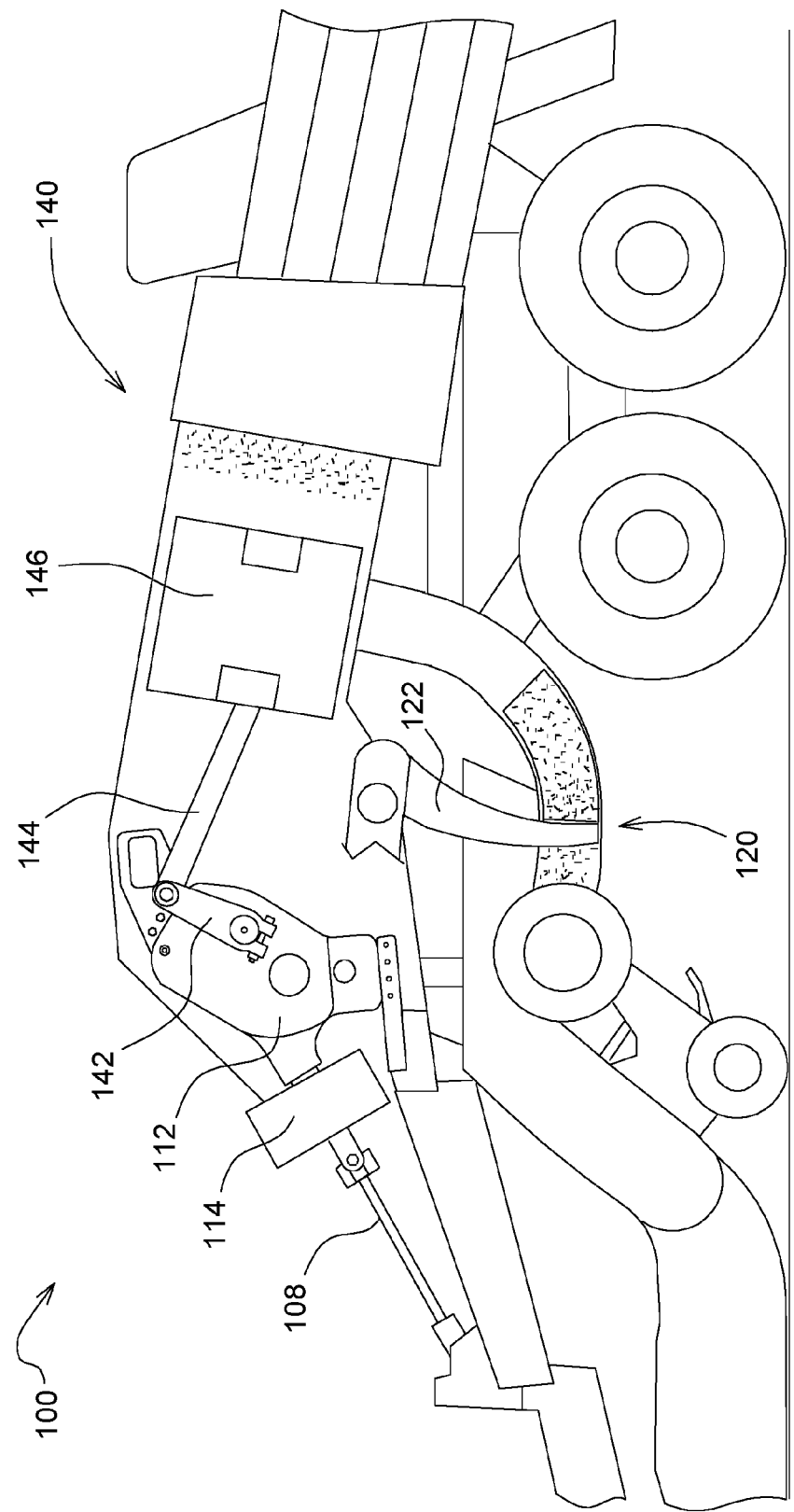
FIG. 9 is a schematic side view of an agricultural harvesting machine, according to one embodiment.

FIG. 1 illustrates an agricultural harvesting machine 100, such as a baler, according to one embodiment. Although a large square baler is shown, this disclosure also applies to other balers and harvesting machines. The agricultural harvesting machine 100 may be coupled to an agricultural vehicle 101, such as a tractor, or the agricultural harvesting machine 100 may be self-propelled. The agricultural harvesting machine 100 may be combined or integrated with a cotton harvester, a combine, or other harvesting machines. The agricultural harvesting machine 100 and the agricultural vehicle 101 may each include a controller 180, which will be discussed in more detail below. For ease of reference, the remaining description will refer to the agricultural harvesting machine 100 as a baler. As depicted in FIG. 1, the baler 100 may move across a field and gather and process crop material to form a crop package 118, such as a bale. The baler 100 may then eject the bale 118 from the rear of the baler 100.

With reference to FIGS. 1-3 and 5, the baler 100 may include a frame 102, ground engaging devices 104, such as wheels, a hitch 106 for attachment to a tractor or other vehicle, and an input shaft 108, such as a power-take-off (PTO) shaft, which can receive rotational power from a tractor 101, other vehicle agricultural vehicles, or other power sources. As depicted in the FIGURES, for example in FIG. 3, the forward portion or direction of the baler 100 is generally to the left and the rearward portion or direction of the baler 100 is generally to the right. The baler 100 may include a pick-up mechanism 110 which gathers crop material from the ground surface and feeds it into the baler 100. The pick-up mechanism 110 may include various pick-up apparatus 111 including, but not limited to, tines, forks, augers, conveyors, baffles, a cutter or pre-cutter assembly, or any combination of the preceding. The baler 100 may include a housing 116, which generally shields various internal components of the baler 100. The input shaft or PTO shaft 108 may connect to an input of the gear train or transmission 112 providing rotational power to the baler 100 from the tractor 101 or other associated vehicle or power source. The transmission 112 may include a gearbox which converts the rotational motion of the input shaft 108 along a generally longitudinal axis of the baler 100 to a rotational motion along a generally transverse axis of the baler 100. A flywheel 114 may connect to the input shaft 108, the transmission 112, or both. The flywheel 114 can be positioned between the transmission 112 and the input shaft 108, as shown.

The baler 100 can have a startup mode or state in which the input shaft 108 receives rotational power and begins to move or rotate, which causes the transmission 112, flywheel 114, and other components to also begin to move or rotate. The baler 100 remains in the startup mode until these components accelerate to a pre-determined or operational speed required for normal function of the baler 100. Once these components have reached the operational speed, then the baler 100 can proceed from the startup mode to an operational mode or state. One or more of the components of the baler 100 can be decoupled from the input shaft 108, or rotational power source, during the startup mode.

With references to FIGS. 2-4 and 7-9, the baler 100 may include a pre-compression chamber 120 which receives crop material from the pick-up mechanism 110 and accumulates the crop material until a pre-determined fill condition. A loading mechanism 122, or stuffer, moves crop material into the pre-compression chamber 120. The loading mechanism 122 may include projections 124, such as tines or forks, which are inserted or extended into the pre-compression chamber 120, at or near the entrance, to move crop material into and through the pre-compression chamber 120. The projections 124 can then be removed or retracted from the pre-compression chamber 120, at or near the exit, and repositioned at or near the entrance of the pre-compression chamber 120.

The pre-compression chamber 120 may include an accumulation phase and a loading phase. During the accumulation phase, the loading mechanism 122 moves crop material provided by the pick-up mechanism 110 into the pre-compression chamber 120 until the pre-compression chamber 120 reaches a pre-determined fill condition, as shown for example in FIG. 7. The projections 124 may move from at or near the entrance of the pre-compression chamber 120 to an intermediate position in the pre-compression chamber 120 in a smaller accumulation stroke pattern 126. In this manner, the loading mechanism 122 adds or accumulates crop material in the pre-compression chamber 120 until the pre-determined fill condition has been attained. The loading phase may then be initiated. During the loading phase, the loading mechanism 122 moves crop material from the pre-compression chamber 120 into the compression chamber 140, as shown for example in FIG. 8. The projections 124 may move from at or near the entrance of the pre-compression chamber 120 to at or near the exit of the pre-compression chamber 120 in a larger loading stroke pattern 128.

A trip mechanism 130 may determine when the pre-determined fill condition of the pre-compression chamber 120 has been attained. The trip mechanism 130 may include mechanical devices, sensors, or both. The trip mechanism 130 may include one or more trip plates 132 movably positioned at least partially within the pre-compression chamber 120. The trip plate 132 may move in response to crop material filling the pre-compression chamber 120 until the pre-determined fill condition is attained. A sensor 134 may determine the position of the trip plate 132. Alternatively, or additionally, the trip mechanism 130 may include one or more sensors 136 positioned at any location to sense the fill condition within the pre-compression chamber 120. The sensor 136 could be positioned on one or more of the top, bottom, and side walls of the pre-compression chamber 120. The sensor 136 could be positioned on the loading mechanism 122 including, but not limited to, on the projection 124. The sensor 136 can detect or sense at least one of load, force, displacement, rotation, density, and pressure corresponding to the fill condition of the pre-compression chamber 120.

With reference to FIGS. 3, 5, and 7-9, the baler 100 may include a crank arm 142 connected to the rotational output of the transmission 112. The baler 100 may include a connecting link 144 connected between the crank arm 142 and a plunger 146. The connecting link 144 may include one or more members connecting the crank arm 142 to the plunger 146. The crank arm 142 rotates based upon the output of the transmission 112 and the plunger 146 moves in a reciprocal motion as the crank arm 142 rotates. A sensor 143 may detect or sense the rotational speed, position, or both of the crank arm 142. The plunger 146 extends into the compression chamber 140 compressing the crop material, as shown for example in FIG. 9, and then at least partially retracts from the compression chamber 140 to allow more crop material to enter the compression chamber 140, as shown for example in FIG. 8. A sensor 147 can detect or sense one or more of the position, direction, and speed of the plunger 146. The connecting link 144 can have extended and retracted conditions or positions. The connecting link 144 can extend or lengthen and retract or shorten, as shown for example in FIGS. 10A-D. The connecting link 144 can also have a plurality of intermediate positions between a fully extended position and a fully retracted position. The connecting link 144 can be a hydraulic or pneumatic actuator or cylinder, a linear actuator, or other types of actuators. The connecting link 144 can be double acting cylinder.

Alternatively or additionally, the crank arm 142 can extend or lengthen and retract or shorten, as shown for example in FIGS. 13A-D. The crank arm 142 can have extended and retracted conditions or positions. The crank arm 142 can also have a plurality of intermediate positions between a fully extended position and a fully retracted position. The crank arm 142 can be a hydraulic or pneumatic actuator or cylinder, a linear actuator, or other types of actuators. The crank arm 142 can be double acting cylinder. In one or more embodiments, both the connecting link 144 and the crank arm 142 can have extended and retracted conditions or positions. The baler 100 may include a plunger brake 148 to maintain the plunger 146 at a pre-determined position. When engaged, the plunger brake 148 may maintain the plunger 146 in a substantially stationary position, in which the plunger 146 moves slightly or is completely stationary. The plunger brake 148 may prevent or reduce the movement of the plunger 146 in a retracted condition or position. The plunger brake 148 may operate mechanically, hydraulically, pneumatically, electrically, or any combination of the preceding.

With reference to FIGS. 2-3, 6, and 6A, the baler 100 may include a binding or knotter system 150, which binds the compressed crop material in the compression chamber 140 into a crop package, such as a bundle or bale. The binding system 150 may include one or more binding or knotter assemblies 152 and one or more binding material needles 154, which can deliver binding material to the binding assemblies 152. The binding system 150 wraps and secures a binding material around the compressed crop material during a binding operation. A sensor 151 may detect or sense when the binding system 150 is activated and the binding operation is commenced. The baler 100 may include a measuring device 156, such as a star wheel, which measures the length of the compressed crop material within the compression chamber 140. The measuring device 156 can activate the binding system 150 when the compressed crop material within the compression chamber 140 reaches a desired mass, size, or length. The measuring device 156 may activate the binding assembly 152 via a mechanical trip assembly 158. The one or more binding material needles 154 may each move from a lowered position generally below or underneath the baler 100, shown for example in FIG. 6, to a raised position, as shown for example in FIG. 6A, passing through a slot in the bottom of the compression chamber 140, a vertically extending slot 149 in the plunger 146, and a slot in the top in of the compression chamber 140. The one or more needles 154 may deliver binding material, such as string or twine, to the binding assembly 152, which secures the binding material around the compressed crop material within the compression chamber 140. A sensor 157 may detect or sense when the measuring device 156 activates the mechanical trip assembly 158, or when the mechanical trip assembly 158 activates the binding assembly 152, or both. Alternatively or additionally, a sensor 157 may measure the rotation of the measuring device 156 and then activate the binding system 150 at a pre-determined amount of rotation using an electrical or electronic trip assembly instead of the mechanical trip assembly 158.

FIGS. 10A-D illustrate a plunger 146 in an active or run mode or state, according to one embodiment. In the active or run mode, the plunger 146 extends and retracts in a reciprocal motion along an axis Z as the crank arm 142 progresses around a full revolution. The plunger 146 can complete a full stroke when it moves from the fully retracted position to the fully extended position and then back again as the crank arm 142 completes one revolution. As depicted in the embodiment in FIGS. 10A-D, the crank arm 142 has a fixed length and the connecting link 144 has a variable or adjustable length. The connecting link 144 is pivotally coupled to the crank 142 at or near one end and to the plunger 146 at or near the other end.

FIG. 10A illustrates the plunger 146 in a fully retracted position or condition with the crank arm 142 in an initial or forward position approximately parallel to the direction of travel of the plunger 146 in a direction away from the plunger 146 and the compression chamber 140. In this position, the connecting link 144 can be retracted to or near its shortest or minimum length.

FIG. 10B illustrates the plunger 146 in an intermediate position or condition as the plunger 146 travels towards the compression chamber 140. The crank arm 142 is positioned approximately perpendicular to the direction of travel of the plunger 146. The connecting link 144 is extended to an intermediate length between fully retracted and fully extended.

FIG. 10C illustrates the plunger 146 in a fully extended position or condition with the crank arm 142 in a rearward position approximately parallel to the direction of travel of the plunger 146 in a direction towards the plunger 146 and the compression chamber 140. In this position, the connecting link 144 can be extended to or near its longest or maximum length. The dimension X represents the total amount of travel of the pivotal connection between the crank arm 142 and the connecting link 144 along the axis Z, and dimension Y represents the corresponding total amount of travel of the plunger 146 along the axis Z. As depicted, the dimension Y is greater than dimension X due to the extension and retraction of the connecting link 144.

FIG. 10D illustrates the plunger 146 in an intermediate position or condition as the plunger 146 travels away from the compression chamber 140. The crank arm 142 is positioned approximately perpendicular to the direction of travel of the plunger 146. The connecting link 144 is retracted to an intermediate length between fully retracted and fully extended.

FIGS. 11A-B illustrate a plunger 146 in a run mode or state, according to one embodiment. The plunger 146 extends and retracts in a reciprocal motion along an axis Z as the crank arm 142 progresses around a full revolution. As depicted in the embodiment in FIGS. 11A-B, the crank arm 142 has a fixed length and the connecting link 144 has a variable or adjustable length. The connecting link 144 includes a first member 144a pivotally coupled to the crank 142 and a second member 144b pivotally coupled to the first member 144a and the plunger 146. The connecting link 144 includes an actuator 145 pivotally coupled to the first and second members 144a, 144b. When the actuator 145 is retracted, the connecting link 144 is retracted, and when the actuator is extended, the connecting link 144 is extended.

FIG. 11A illustrates the plunger 146 in a fully retracted position or condition with the crank arm 142 positioned approximately parallel to the direction of travel of the plunger 146 in a direction away from the plunger 146. In this position, the connecting link 144 can be retracted to or near its shortest or minimum length with the actuator 145 being retracted.

FIG. 11B illustrates the plunger 146 in a fully extended position or condition with the crank arm 142 positioned approximately parallel to the direction of travel of the plunger 146 in a direction towards the plunger 146. In this position, the connecting link 144 can be extended to or near its longest or maximum length with the actuator 145 being extended. The dimension X represents the total amount of travel of the pivotal connection between the crank arm 142 and the connecting link 144 along the axis Z, and dimension Y represents the corresponding total amount of travel of the plunger 146 along the axis Z. As depicted, the dimension Y is greater than dimension X due to the extension and retraction of the connecting link 144.

Figure 12A:
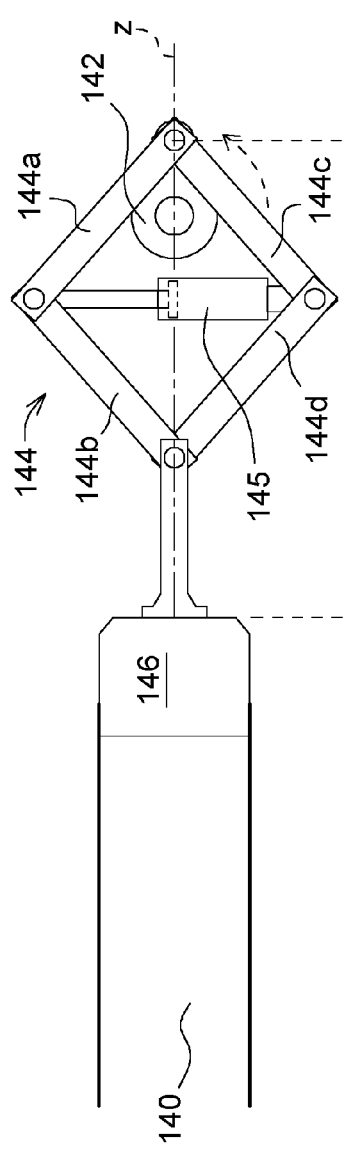
FIGS. 12A, 12B, and 12C are schematic side views of an agricultural harvesting machine, according to one embodiment.
Figure 12B:
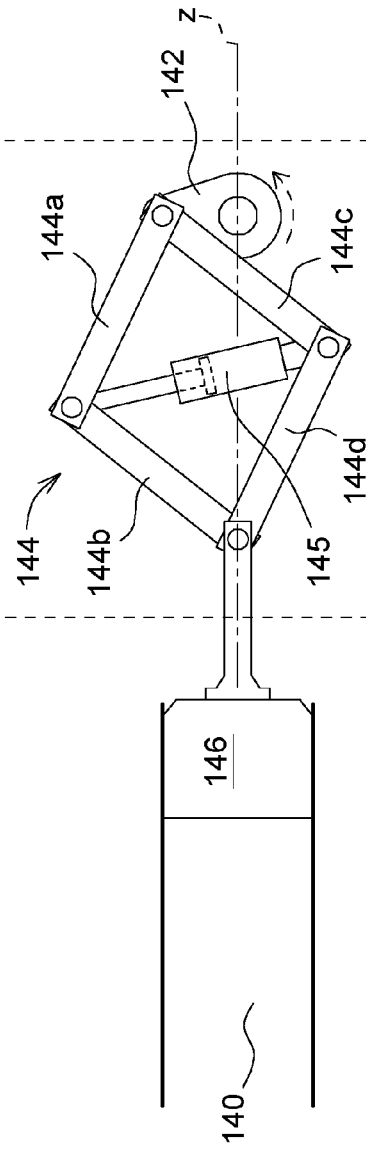
Figure 12C:
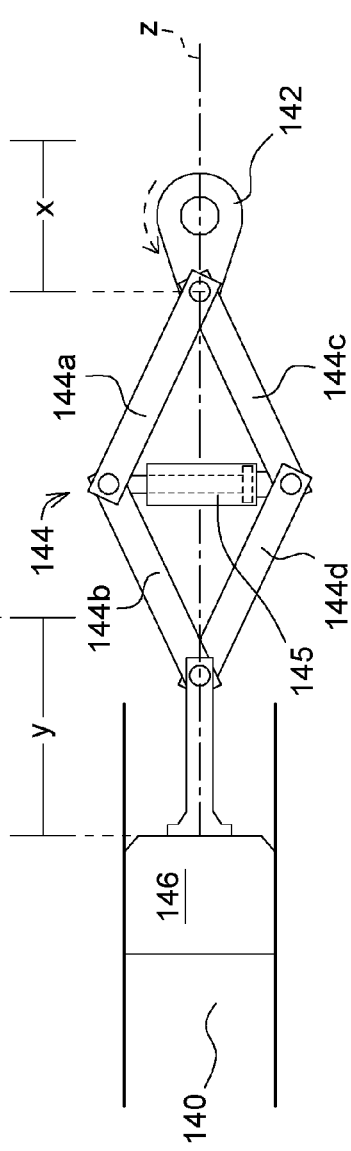

FIGS. 12A-C illustrate a plunger 146 in a run mode or state, according to one embodiment. The plunger 146 extends and retracts in a reciprocal motion along an axis Z as the crank arm 142 progresses around a full revolution. As depicted in the embodiment in FIGS. 12A-C, the crank arm 142 has a fixed length and the connecting link 144 has a variable or adjustable length. The connecting link 144 includes a first member 144a pivotally coupled to the crank 142 and a second member 144b pivotally coupled to the first member 144a and the plunger 146. The connecting link 144 also includes a third member 144c pivotally coupled to the crank 142 and a fourth member 144d pivotally coupled to the third member 144c and the plunger 146. The connecting link 144 includes an actuator 145 pivotally coupled to the first and second members 144a, 144b at or near one end and the third and fourth members 144c, 144d at or near the other end.

FIG. 12A illustrates the plunger 146 in a fully retracted position or condition with the crank arm 142 positioned approximately parallel to the direction of travel of the plunger 146 in a direction away from the plunger 146. In this position, the connecting link 144 can be retracted to or near its shortest or minimum length with the actuator 145 being extended.

FIG. 12B illustrates the plunger 146 in an intermediate position or condition as the plunger 146 travels towards the compression chamber 140. The crank arm 142 is positioned approximately perpendicular to the direction of travel of the plunger 146. The connecting link 144 is extended to an intermediate length between fully retracted and fully extended with the actuator 145 being at least partially extended.

FIG. 12C illustrates the plunger 146 in a fully extended position or condition with the crank arm 142 positioned approximately parallel to the direction of travel of the plunger 146 in a direction towards the plunger 146. In this position, the connecting link 144 can be extended to or near its longest or maximum length with the actuator 145 being retracted. The dimension X represents the total amount of travel of the pivotal connection between the crank arm 142 and the connecting link 144 along the axis Z, and dimension Y represents the corresponding total amount of travel of the plunger 146 along the axis Z. As depicted, the dimension Y is greater than dimension X due to the extension and retraction of the connecting link 144.

FIGS. 13A-D illustrate a plunger 146 in a run mode or state, according to one embodiment. The plunger 146 extends and retracts in a reciprocal motion along an axis Z as the crank arm 142 progresses around a full revolution. As depicted in the embodiment in FIGS. 13A-D, the crank arm 142 has a variable or adjustable length and the connecting link 144 has a fixed length. The connecting link 144 is pivotally coupled to the crank 142 at or near one end and to the plunger 146 at or near the other end.

FIG. 13A illustrates the plunger 146 in a fully retracted position or condition with the crank arm 142 positioned approximately parallel to the direction of travel of the plunger 146 in a direction away from the plunger 146. In this position, the crank arm 142 can be retracted to or near its shortest or minimum length.

FIG. 13B illustrates the plunger 146 in an intermediate position or condition as the plunger 146 travels towards the compression chamber 140. The crank arm 142 is positioned approximately perpendicular to the direction of travel of the plunger 146. The crank arm 142 is extended to an intermediate length between fully retracted and fully extended.

FIG. 13C illustrates the plunger 146 in a fully extended position or condition with the crank arm 142 positioned approximately parallel to the direction of travel of the plunger 146 in a direction towards the plunger 146. In this position, the crank arm 142 can be extended to or near its longest or maximum length. The dimension X represents the total amount of travel of the pivotal connection between crank arm 142 and the connecting link 144 along the axis Z, and dimension Y represents the corresponding total amount of travel of the plunger 146 along the axis Z. As depicted, the dimension X is substantially the same as dimension Y due to the crank arm 142 extending and retracting instead of the connecting link 144.

FIG. 13D illustrates the plunger 146 in an intermediate position or condition as the plunger 146 travels away from the compression chamber 140. The crank arm 142 is positioned approximately perpendicular to the direction of travel of the plunger 146. The crank arm 142 is retracted to an intermediate length between fully retracted and fully extended.

FIGS. 10A-13D have depicted the connecting link 144 as varying or adjusting in length in the run mode. Alternatively, the crank arm 142 could have a variable or adjustable length or both the crank arm 142 and the connecting link 144 could have variable or adjustable lengths.

FIGS. 14A-D illustrate a plunger 146 in an inactive or decoupled mode or state, according to one embodiment. The plunger 146 can be decoupled from the crank arm 142 when the first and second valves 164, 166 are in their respective dump positions and the pump 160 is in the neutral mode. In the decoupled mode, the plunger 146 can be allowed or permitted to move or float independent of the crank arm. Conversely, the plunger 146 can be coupled to the crank arm 142 when the first and second valves 164, 166 are in their respective operation positions and the pump 160 is in the operation mode alternatively providing fluid to the first and second ports 176, 178 of the connecting link 144 via the first and second valves 164, 166. In the inactive mode, the plunger 146 can be located anywhere along an axis Z between and including the fully retracted and fully extended positions independent of the movement and position of the crank arm 142. The plunger 146 can remain in its position along an axis Z as the crank arm 142 progresses around a full revolution. The plunger 146 may remain substantially stationary in its position along the axis Z. Alternatively, the plunger 146 can be allowed to move through a partial stroke instead of a full stroke or through a full stroke but at a slower speed than when the plunger 146 is in the active mode. This can be accomplished by having an extendable connecting link 144, as shown for example in FIGS. 10A-12C, an extendable crank arm 142, as shown for example in FIGS. 13A-D, or both. As depicted in FIGS. 14A-D, the crank arm 142 has a fixed length and the connecting link 144 has a variable or adjustable length. The plunger 146 can be in the inactive or decoupled mode when the baler 100 is in the startup mode.

FIG. 14A illustrates the plunger 146 in a retracted position with the crank arm 142 in the forward position approximately parallel to the direction of travel of the plunger 146 in a direction away from the plunger 146. The connecting link 144 is at an intermediate length between fully retracted and fully extended.

FIG. 14B illustrates the plunger 146 remaining in the retracted position with the crank arm 142 positioned approximately perpendicular to the direction of travel of the plunger 146. The connecting link 144 is retracting or shortening to maintain the plunger 146 in the retracted position. The connecting link 144 is at an intermediate length between fully retracted and fully extended.

FIG. 14C illustrates the plunger 146 remaining in the retracted position with the crank arm 142 in the rearward position approximately parallel to the direction of travel of the plunger 146 in a direction towards the plunger 146. The connecting link 144 is further retracting or shortening to maintain the plunger 146 in the retracted position. In this position, the connecting link 144 can be at its shortest or minimum length. The dimension X represents the total amount of travel of the pivotal connection between the crank arm 142 and the connecting link 144 along the axis Z while the plunger 146 remains substantially stationary along the axis Z.

FIG. 14D illustrates the plunger 146 remaining in the retracted position with the crank arm 142 is positioned approximately perpendicular to the direction of travel of the plunger 146. The connecting link 144 is extending or lengthening to maintain the plunger 146 in the retracted position. The connecting link 144 is at an intermediate length between fully retracted and fully extended.

FIGS. 15A-D illustrate a plunger 146 in an active or run mode or state, according to one embodiment. The speed of the plunger 146 can vary due to the selectively adjustable length of the connecting link 144 or the crank arm 142. The plunger 146 may increase or decrease speed at any position along the axis Z. The run mode may include an event phase, in which the plunger 146 changes speeds or remains in pre-determined position for a prolonged or lengthened amount of time due to the change in length of the connecting link 144 or the crank arm 142 as the crank arm 142 continues rotating. The crank arm 142 may rotate through a partial or full revolution causing the connection point between the crank arm 142 and the connecting link 144 to move a specified distance along the axis Z. The change in length of the connecting link 144 or the crank arm 142 can cause the plunger 146 to move at an increased speed and greater distance along the axis Z, or at a decreased speed and lesser distance along the axis Z. The event phase can occur based upon a position of the crank arm 142, connecting link 144, or plunger 146, or it can occur based upon an event, for example the commencement of the binding operation. The event phase can occur during every revolution of the crank arm 142, at a specified or pre-determined number of revolutions of the crank arm 142, or other operations of the baler 100.

As depicted in FIGS. 15A-D, the plunger 146 can move at a first speed from the position shown in FIG. 15A to the position shown in FIG. 15B. The plunger 146 can then continue moving at the first speed from the position shown in FIG. 15B and then begin to slow down as the plunger 146 approaches the position shown in FIG. 15C. The plunger 146 can extend further into the compression chamber 140 as the crank arm 142 moves from the position shown in FIG. 15C towards the position shown in FIG. 15D. This allows for a longer, slower compression of the crop material in the compression chamber 140. The plunger 146 can then move at a faster second speed from the position in FIG. 15D to the position in FIG. 15A to return to the retracted position and reset for the next compression cycle.

Alternately or additionally, the plunger 146 may remain in a pre-determined position as the crank arm 142 continues to rotate. The pre-determined position can be any position between and including fully retracted and fully extended. As shown for example in FIG. 15D, the plunger 146 may remain in the extended, or fully extended, position for a prolonged or lengthened amount of time as the crank arm 142 continues rotating. As depicted in the embodiment in FIGS. 15A-D, the crank arm 142 has a fixed length and the connecting link 144 has a variable or adjustable length. The connecting link 144 is pivotally coupled to the crank 142 at or near one end and to the plunger 146 at or near the other end. The plunger 146 may include one or more vertically extending slots 149 sized to allow the one or more binding material needles 154 to pass through and deliver binding material to the binding assembly 152.

FIG. 15A illustrates the plunger 146 in a fully retracted position or condition with the crank arm 142 in an initial or retracted position approximately parallel to the direction of travel of the plunger 146 in a direction away from the plunger 146 and the compression chamber 140. In this position, the connecting link 144 is at an intermediate length between fully retracted and fully extended. The binding deliver needles 154 are in the lowered position.

FIG. 15B illustrates the plunger 146 in an intermediate position or condition as the plunger 146 travels towards the compression chamber 140. The crank arm 142 is positioned approximately perpendicular to the direction of travel of the plunger 146. The connecting link 144 can be at the same or similar intermediate length as depicted in FIG. 15A, or the connecting link 144 can be further extended to another intermediate length between fully retracted and fully extended. The binding deliver needles 154 remain in the lowered position.

FIG. 15C illustrates the plunger 146 in a fully extended position or condition with the crank arm 142 in an extended position approximately parallel to the direction of travel of the plunger 146 in a direction towards the plunger 146 and the compression chamber 140. In this position, the connecting link 144 is at an intermediate length and can still be extended further to or near its longest or maximum length. In this position, the plunger 146 is compressing the crop material at or near its maximum compression. In some embodiments, the plunger 146 could extend further into the compression chamber 140 to attain the maximum compression after the crank arm 142 begins to rotate away from the compression chamber 140. This allows for a slower compression of the crop material over a longer period of time. As depicted in this embodiment, an event phase has been activated or triggered. The event phase could begin upon the activation of the binding assembly 152, and the commencement of the binding operation, or upon the position of the crank arm 142 or plunger 146. In this embodiment, the binding assembly 152 has been activated and the binding operation has commenced. The binding material needles 154 have moved to their raised position delivering binding material to the binding assembly 152, which can begin securing the binding material around the compressed crop material.

FIG. 15D illustrates the plunger 146 remaining in the fully extended position or condition based upon the activation of the event phase. As depicted, the crank arm 142 is positioned approximately perpendicular to the direction of travel of the plunger 146. The connecting link 144 is extended to or near its longest or maximum length. The activation of the binding assembly 152 can cause the plunger 146 to slow or stop and remain at or near the fully extended position. In this position, the plunger 146 maintains the crop material at or near its maximum compression while the binding assembly 152 secures the binding material around the compressed crop material. Because the plunger 148 remains at or near the fully extended position for a longer period of time, the binding assembly 152 has additional time to the secure the binding material around the compressed crop material. In addition, the binding assembly 152 can secure the compressed crop material into a crop package or bale when the compressed crop material is at or near the maximum compression. This can result in the crop packages or bales having a higher density. In this embodiment, the plunger 146 remains at the fully extended position or condition for about a one-fourth or quarter of a revolution of the crank arm 142. In other embodiments, the plunger 146 can remain at the fully extended position for any partial or full revolution or multiple revolutions of the crank arm 142. Once the event phase is complete, for example the binding operation completes or the position of the crank arm 142 changes, the plunger 146 can return from the extended position, as shown in FIG. 15D, to the retracted position, as shown in FIG. 15A, in the remaining quarter revolution of the crank arm 142, or any other partial or full revolution to synchronize the retracted position of the plunger 146 with the initial or forward position of the crank arm 142. This can be accomplished by retracting, or shortening, the connecting link 144 while the crank arm 142 is returning to the starting position depicted in FIG. 15A.

The positions of the plunger 146 and crank arm 142 can be considered synchronized when the position of the rotating crank arm 142 corresponds to the position of the stationary plunger 146 as if they were coupled. For example, the position of the crank arm 142 is synchronized with the position of the plunger 146 if the plunger 146 is extended and the crank arm 142 is in its rearward position, as shown for example in FIG. 10C, or if the plunger 146 is retracted and the crank arm 142 is in its forward position, as shown for example in FIG. 10A. As another example, the position of the crank arm 142 can be synchronized with the position of the plunger 146 if the plunger 146 is approximately midway between its extended and retracted positions and the crank arm 142 is approximately midway between its forward and rearward positions, as shown for example in FIG. 10B or 10C.

In addition to the embodiments depicted in FIGS. 14A-D and 15A-D, the plunger 146 can also be maintained in a plurality of different positions between the extended and retracted positions during a partial revolution, full revolution, or multiple revolutions of the crank arm 142. The baler 100 can have an event which activates or triggers the plunger 146 to slow down and remain in one of the plurality of positions during the event, or speed up to arrive at one of the plurality of positions during the event. The plunger 146 can be maintained in one of the plurality of positions by one or more of the connecting link 144 and the crank arm 142 having variable or adjustable lengths. Some embodiments may include any of the extendable connecting links 144 depicted in FIGS. 10A-12C used with an extendable crank arm 142 depicted for example in FIGS. 13A-D. Other combinations of connecting links 144 and crank arms 142 are also contemplated and within the scope of this disclosure.

Figure 16:
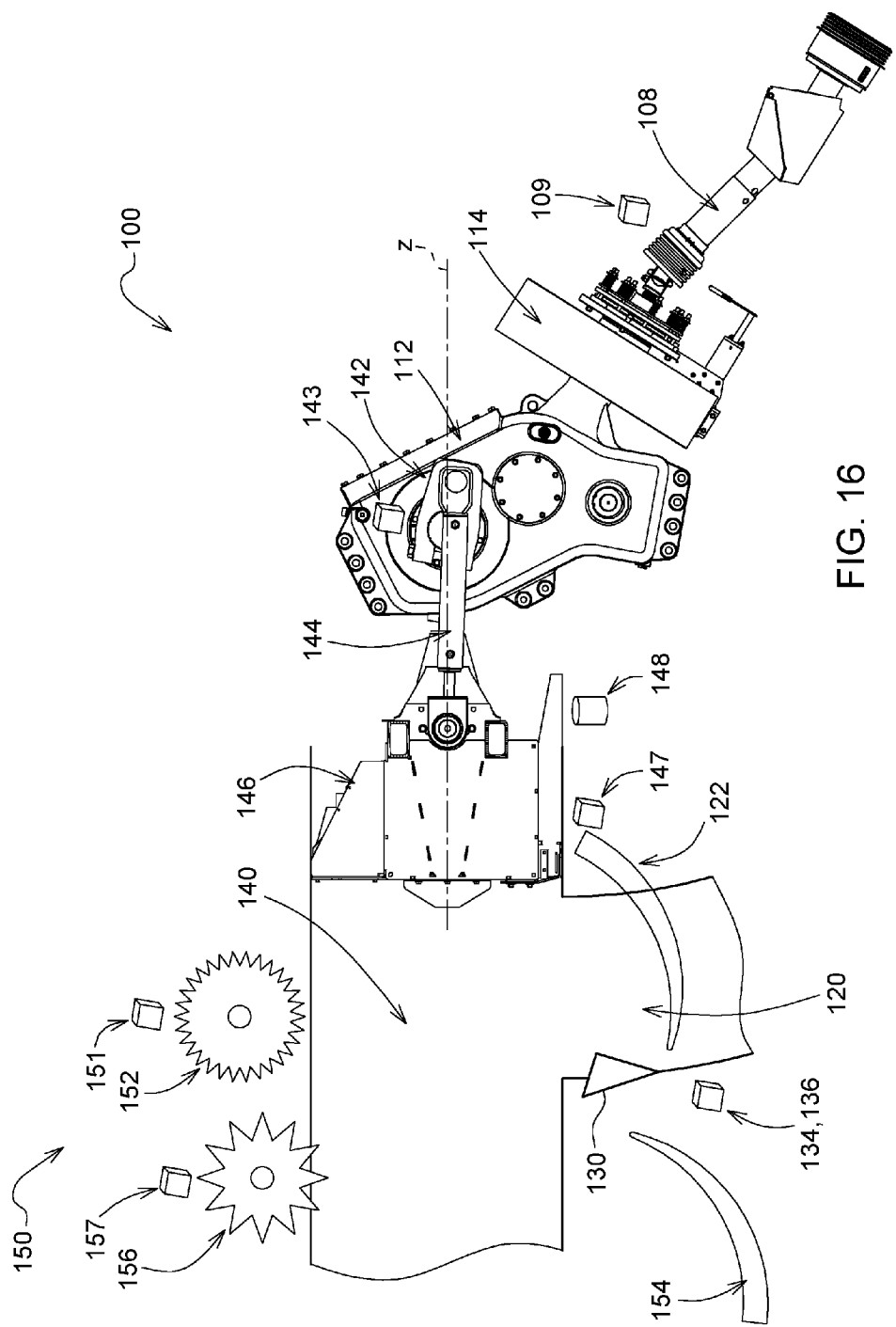
FIG. 16 is a schematic diagram of an agricultural harvesting machine, according to one embodiment.

FIG. 16 illustrates a schematic diagram of a baler 100, according to one embodiment. The baler 100 may include one or more of the following sensors. An input shaft sensor 109 may be positioned on or near the input shaft 108 and can be any type of sensor which detects or senses the speed or rotation of the input shaft 108. A trip sensor 134 may be positioned on or near the trip mechanism 130 and can be any type of sensor which detects the movement or rotation of the trip mechanism 130. A pre-compression chamber sensor 136 may be positioned on, in, or near the pre-compression chamber 120 and can be any type of sensor which detects a fill condition of the pre-compression chamber 120. A crank arm sensor 143 may be positioned on or near the crank arm 142 and can be any type of sensor which detects movement or rotation of the crank arm 142. A plunger sensor 147 may be positioned on or near the plunger 146 and can be any type of sensor which detects the position or movement of the plunger 146. A binding sensor 151 may be positioned on or near the binding system 150 and can be any type of sensor which detects when the binding system 150 is activated. A measurement sensor 157 may be positioned on or near the binding system 150 and can be any type of sensor which detects when the crop material within the compression chamber 140 has reached a pre-determined quantity.

Figure 17:
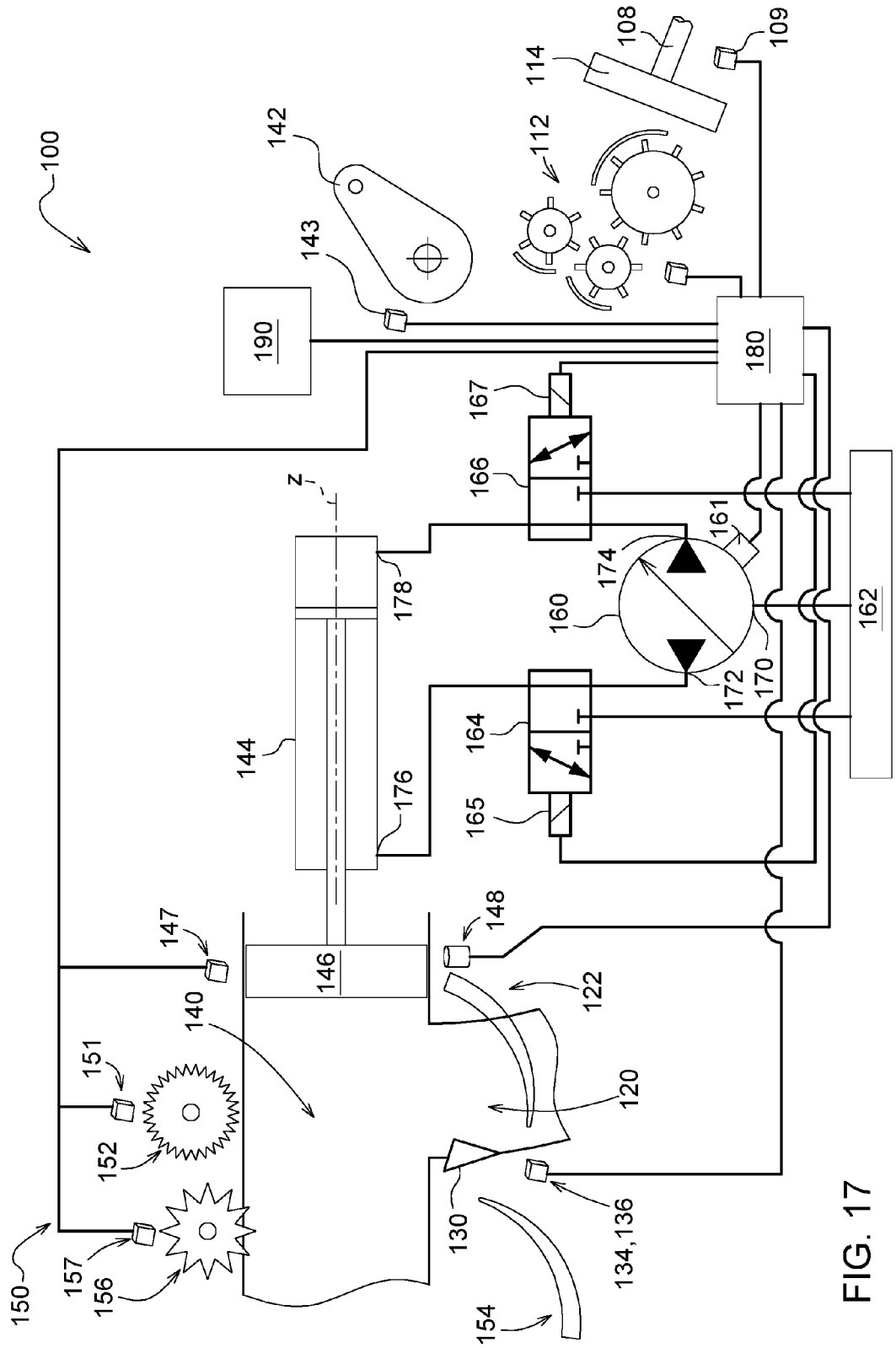
FIG. 17 is a schematic diagram of an agricultural harvesting machine, according to one embodiment.

With reference to FIG. 17, the baler 100 may include a hydraulic, pneumatic, or electrical system to power and actuate the connecting link 144. The following description is directed to an implementation of an example hydraulic system, which is also applicable to a similarly arranged pneumatic or electrical system. The baler 100 may include a hydraulic pump 160, or other power source, fluidly connected to a hydraulic reservoir 162, or other storage, and one or more hydraulic valves 164, 166, or other flow control devices. The hydraulic pump 160 can be a bi-directional variable displacement pump. The pump 160 can have an operation mode, providing fluid to the hydraulic system, or a neutral mode. The valves 164, 166 can be two-position, three-way directional control valves. The valves 164, 166 can each include a transducer or solenoid 165, 167 for actuating the valve. The input 170 of the hydraulic pump 160 can be fluidly connected to the hydraulic reservoir 162.

A first output 172 of the pump 160 can be fluidly connected to a first hydraulic valve 164 and the second output 174 can be fluidly connected to a second hydraulic valve 166. The first valve 164 can be fluidly connected to the reservoir 162 and a first port 176 of the connecting link 144. The second valve 166 can be fluidly connected to the reservoir 162 and a second port 178 of the connecting link 144. When the first valve 164 is in a first position, or operation position, the pump 160 is fluidly connected to first port 176 of the connecting link 144. When the first valve 164 is in a second position, or dump position, the first port 176 of the connecting link 144 is fluidly connected to the reservoir 162. When the second valve 166 is in a first position, or operation position, the pump 160 is fluidly connected to the second port 178 of the connecting link 144. When the second valve 166 is in a second position, or dump position, the second port 178 of the connecting link 144 is fluidly connected to the reservoir 162. In this embodiment, the crank arm 142 and the plunger 146 are coupled when the first and second valves 164, 166 are in their respective operation positions and the pump 160 is in the operation mode alternatively providing fluid to the first and second ports 176, 178 of the connecting link 144 via the first and second valves 164, 166. In addition, the crank arm 142 and the plunger 146 are decoupled when the first and second valves 164, 166 are in their respective dump positions and the pump 160 is in the neutral mode.

To retract the connecting link 144, and the connected plunger 146, the pump 160 provides fluid to the first port 176 via the first valve 164, in its operation position, and the second valve 166 can either be in the operation position or the dump position. The controller 180 can determine whether to retract the connecting link 144 and the speed of the retraction by controlling the quantity of fluid provided to the first port 176 through the first valve 164. To extend the connecting link 144, and the connected plunger 146, the pump 160 provides fluid to the second port 178 via the second valve 166, in its operation position, and the first valve 164 can either be in the operation position or the dump position. The controller 180 can determine whether to extend the connecting link 144 and the speed of the extension by controlling the quantity of fluid provided to the second port 178 through the second valve 166. Accordingly, to vary the speed of the retraction or extension of the plunger 146, the pump 160 varies the amount of fluid provided to first or second ports 176, 178 of the connecting link 144 via the first and second valves 164, 166 respectively.

With continued reference to FIG. 17, the baler 100 may include an electronic control unit 180, or controller, having one or more microprocessor-based electronic control units or controllers, which perform calculations and comparisons and execute instructions. The controller 180 may include a processor, a core, volatile and non-volatile memory, digital and analog inputs, and digital and analog outputs. The controller 180 may connect to and communicate with various input and output devices including, but not limited to, switches, relays, solenoids, actuators, light emitting diodes (LED's), liquid crystal displays (LCD's) and other types of displays, radio frequency devices (RFD's), sensors, and other controllers. The controller 180 may receive communication or signals, via electrically or any suitable electromagnetic communication, from one or more devices, determine an appropriate response or action, and send communication or signals to one or more devices. The controller 180 can be a programmable logic controller, also known as a PLC or programmable controller.

The controller 180 may connect to a baler 100 electronic control system through a data bus, such as a CAN bus, or the controller 180 can be a part of the baler 100 electronic control system. The controller 180 may be in communication with one or more devices including, but not limited to: the input shaft sensor 109 to receive information about the input shaft 108; the trip sensor 134 to receive information about the trip plate 132; the pre-compression chamber sensor 136 to receive information about the pre-compression chamber 120; the crank arm sensor 143 to receive information about the crank arm 142; the plunger sensor 147 to receive information about the plunger 146; the binding sensor 151 to receive information about the binding system 150 and/or binding operation; the measurement sensor 157 to receive information about the measuring device 156; the pump 150 and/or pump controller 161 to provide commands or instructions and/or receive information about direction and flow; valves 164, 166 and/or solenoids 165, 167 to provide commands or instructions and/or receive information about position and actuation; and a display 190 to receive commands or instructions and provide feedback. The controller 180 may receive communication from and provide communications, controls, or instructions to any of these devices.

Figure 18:
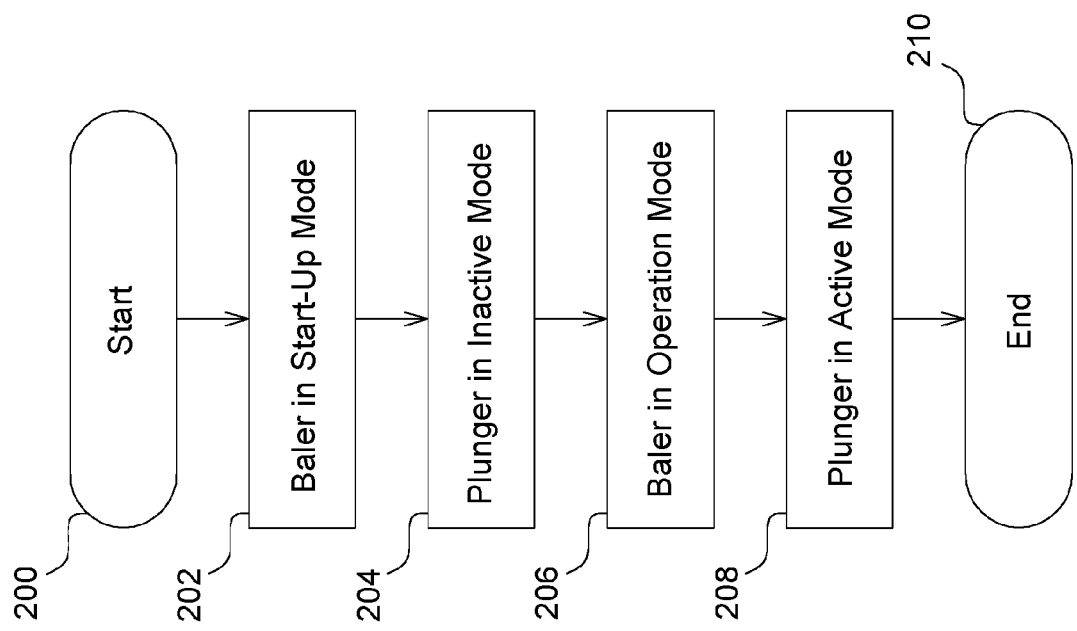
FIG. 18 is a flow chart for a method of operating a startup mode in an agricultural harvesting machine, according to one embodiment.

FIG. 18 illustrates a method of operating a baler 100 in a startup mode, which may be implemented in one or more of the embodiments described herein and depicted in the various FIGURES. At step 200, the method starts.

At step 202, the baler 100 is in a startup mode and power is applied to the input shaft 108 causing the input shaft 108, transmission 112, flywheel 114, and other components to begin moving or rotating. The baler 100 remains in the startup mode as these components increase speed and approach the operational speed of the baler 100. The controller 180 can determine when the baler 100 is in the startup mode based upon the input shaft sensor 109 detecting the speed of the input shaft 108.

At step 204, the plunger 146 is in the inactive mode while the baler 100 is in the startup mode. The plunger 146 is maintained in its current position, anywhere between and including fully retracted and fully extended. The plunger 146 can be maintained in its position by the plunger brake 148 being applied or engaged, the valves 164, 166 being in the dump position, and the pump 160 being in the neutral mode. In the inactive mode, the lengths of one of the crank arm 142 and connecting link 144 can vary or the lengths of both the crank arm 142 and connecting link 144 can vary as the crank arm 142 rotates. The controller 180 can maintain the plunger 146 in its current position during the inactive mode by applying the plunger brake 148, moving the valves 164, 166 to the dump position, and placing the pump 160 in neutral mode.

At step 206, when the components of the baler 100 reach their operational speed, which can be measured by the input shaft sensor 109 or crank arm sensor 143 for example, then the controller can switch the baler 100 from the startup mode to an operational mode.

At step 208, the controller 180 switches the plunger 146 from the inactive mode to the active or run mode. In the run mode, the controller 180 disengages the plunger brake 148, switches the valves 164, 166 to the operation position, and places the pump 160 in the operation mode. The controller 180 then operates the plunger 146 in run mode, and the plunger 146 extends and retracts into and out of the compression chamber 120 in a reciprocal motion, as shown for example in FIGS. 10A-D. In the run mode, the lengths of one of the crank arm 142 and connecting link 144 can vary, the lengths of both the crank arm 142 and connecting link 144 can vary, or the lengths of both the crank arm 142 and connecting link 144 can be fixed. The controller 180 can operate the pump 160 to alternately provide fluid to ports 176, 178 to vary the length of the connecting link 144, as shown for example in FIG. 17.

At step 210, the startup mode of the baler 100 has occurred, according to one embodiment. In other embodiments, one or more of these steps or operations may be omitted, repeated, or re-ordered and still achieve the desired results.

Figure 19:
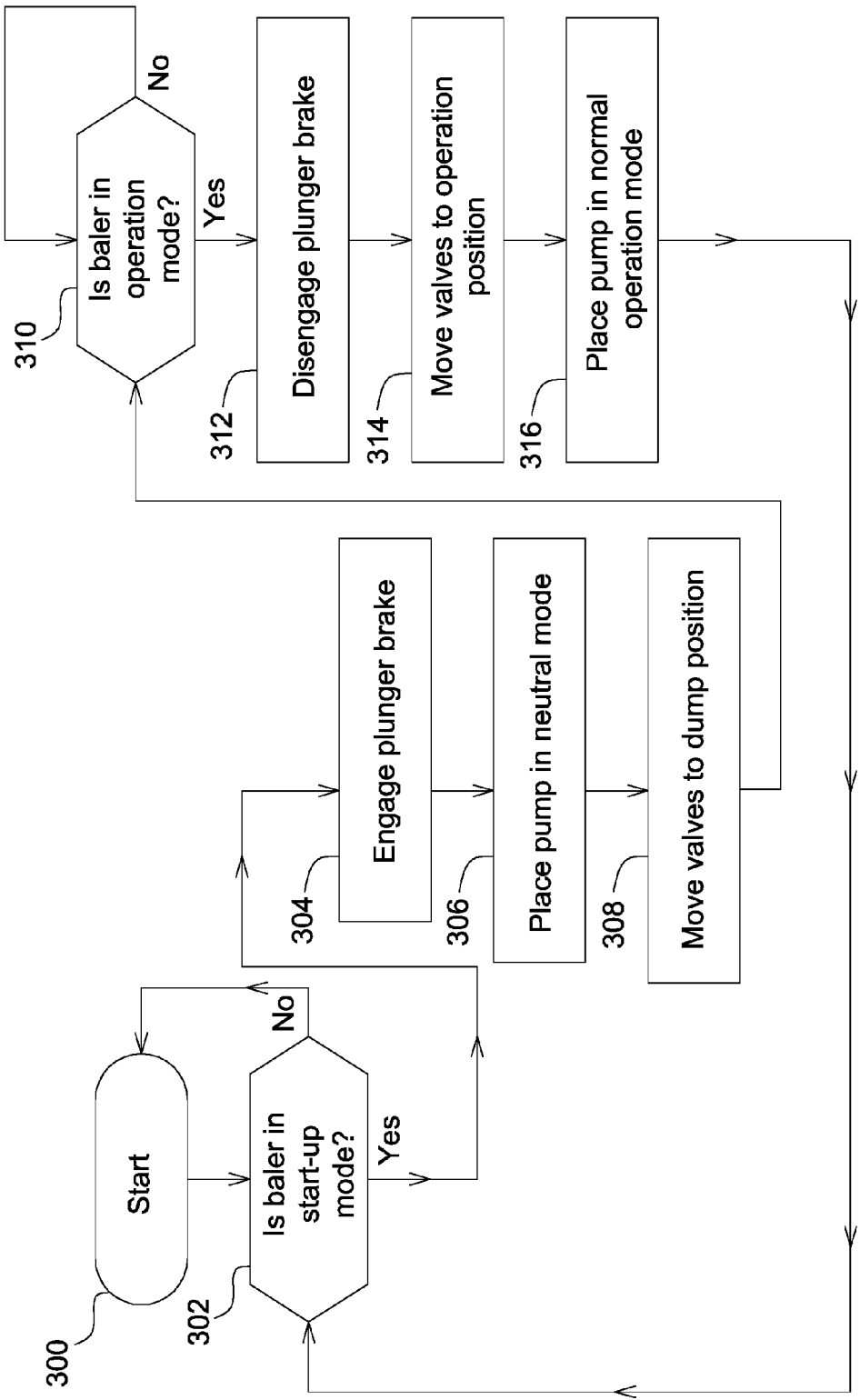
FIG. 19 is a flow chart for a method of operating a startup mode in an agricultural harvesting machine, according to one embodiment.

FIG. 19 illustrates a method of operating a startup mode for a baler 100, which may be implemented in one or more of the embodiments described herein and depicted in the various FIGURES. At step 300, the method starts.

At step 302, the operational state or mode of the baler 100 is determined. A controller 180 may perform this determination by communicating with sensor 109, which can detect the speed of the input shaft 108, or sensor 143, which can detect the speed of the crank arm 142. If the baler 100 is not in a startup mode, then the method returns to step 300 or advances to either step 310 or step 312. If the baler 100 is in the startup mode, then the method continues with step 304.

A step 304, regardless of the position of the plunger 146 within the baler 100, the plunger brake 148 is engaged. The controller 180 may engage the plunger brake 148.

At step 306, the pump 160 is placed in a neutral mode. The controller 180 may switch or shift the pump 160 into neutral mode.

At step 308, the valves 164, 166 are moved to their respective dump positions. The controller 180 may switch or shift the valves 164, 166. Steps 304-308 maintain the plunger 146 in its position in the inactive or stationary mode, as shown for example in FIGS. 14A-D. The plunger 146 can be maintained in any position between and including fully retracted and fully extended during the inactive or stationary mode.

At step 310, the operational state or mode of the baler 100 is determined. A controller 180 may perform this determination. If the baler 100 is not in an operational mode, then the method repeats step 310. If the baler 100 is in the operational mode, then the method continues with step 312.

At step 312, the plunger brake 148 is disengaged. The controller may disengage the plunger brake 148.

At step 314, the valves 164, 166 are moved into their respective operation positions. The controller 180 may switch or shift the valves 164, 166.

At step 316, the pump 160 is placed into operation mode providing fluid to the hydraulic system. The controller 180 may switch or shift the pump 160 into operation mode. Steps 312-316 place the plunger 146 in the run mode so that the plunger 146 can extend and compress the crop material in the compression chamber 140. In the run mode, the plunger 146 extends and retracts in a reciprocal motion until the baler 100 is returned to the startup mode. When the valves 164, 166 and pump 160 are in operation mode, the pump 160 can alternately provide fluid to ports 176, 178 to extend and retract connecting link 144, as shown for example in FIGS. 10A-D and 17. The method then can end or return to step 302.

After step 316, the activation and deactivation of the startup mode of the baler 100 has occurred, according to one embodiment. In other embodiments, one or more of these steps or operations may be omitted, repeated, or re-ordered and still achieve the desired results.

Figure 20:
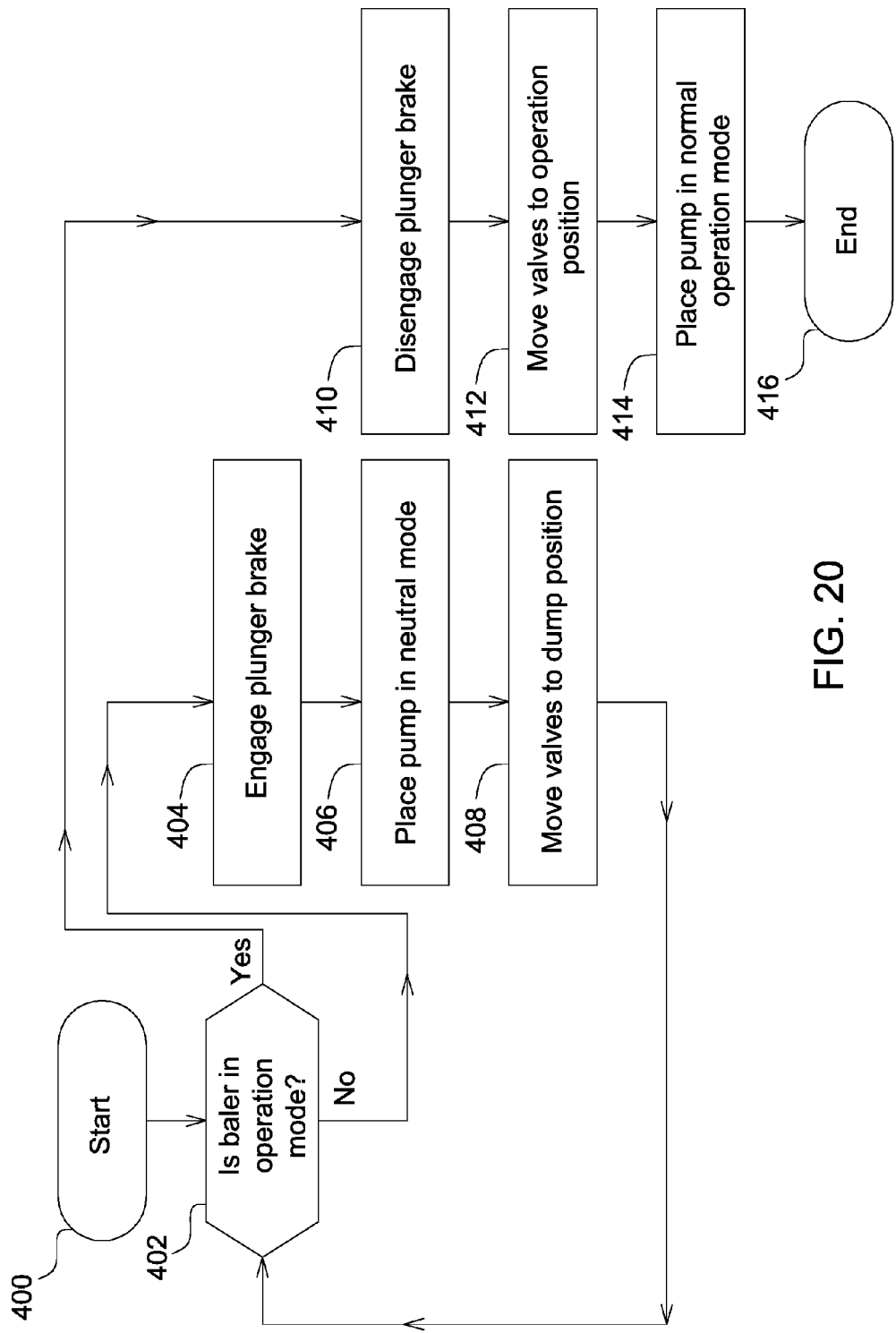
FIG. 20 is a flow chart for a method of operating a startup mode in an agricultural harvesting machine, according to one embodiment.

FIG. 20 illustrates a method of operating a startup mode for a baler 100, which may be implemented in one or more of the embodiments described herein and depicted in the various FIGURES. At step 400, the method starts.

At step 402, the operational state or mode of the baler 100 is determined. A controller 180 may perform this determination. If the baler 100 is in a startup mode, then the method continues with step 404. If the baler 100 is in an operational or run mode, then the method continues with step 410.

A step 404, regardless of the position of the plunger 146 within the baler 100, the plunger brake 148 is engaged. The controller 180 may engage the plunger brake 148.

At step 406, the pump 160 is placed in a neutral mode. The controller 180 may switch or shift the pump 160 into neutral mode.

At step 408, the valves 164, 166 are moved to their respective dump positions. The controller 180 may switch or shift the valves 164, 166. Steps 404-408 maintain the plunger 146 in its position in the inactive or stationary mode, as shown for example in FIGS. 14A-D. The plunger 146 can be maintained in any position between and including fully retracted and fully extended during the inactive or stationary mode. After step 408, the method returns to step 402.

At step 410, the plunger brake 148 is disengaged. The controller may disengage the plunger brake 148.

At step 412, the valves 164, 166 are moved into their respective operation positions. The controller 180 may switch or shift the valves 164, 166.

At step 414, the pump 160 is placed into operation mode providing fluid to the hydraulic system. The controller 180 may switch or shift the pump 160 into operation mode. Steps 410-414 place the plunger 146 in the run mode so that the plunger 146 can extend and compress the crop material in the compression chamber 140. In the run mode, the plunger 146 extends and retracts in a reciprocal motion until the baler 100 is returned to the startup mode. When the valves 164, 166 and pump 160 are in operation mode, the pump 160 can alternately provide fluid to ports 176, 178 to extend and retract connecting link 144, as shown for example in FIGS. 10A-D and 17. The method then can end or return to step 402.

After step 414, the activation and deactivation of the startup mode of the baler 100 has occurred, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is the activation and deactivation of a startup mode in an agricultural harvesting device. Another technical effect of one or more of the example embodiments disclosed herein is the activation and deactivation of a plunger based upon the operational mode of the baler. Another technical effect of one or more of the example embodiments disclosed herein is reducing the amount of torque required during the startup of a baler.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. An agricultural harvesting machine for crop material comprising:
    a crank arm connected to a rotational power source;
    a plunger having an extended position which is located further rearward in a compression chamber than a retracted position; and
    a connecting link connected between the plunger and the crank arm, one of the connecting link and the crank arm having a variable length, the movement of the plunger being decoupled from the movement of the crank arm during a startup mode, in which the crank arm is rotating below an operational speed, and the movement of the plunger being coupled to the movement of the crank arm during a run mode, in which a speed of the crank arm is rotating below an operational speed.

2. The agricultural harvesting machine of claim 1, wherein during the startup mode, one of the connecting link and the crank arm lengthen and shorten to a first plurality of different lengths to decouple the reciprocal motion of the plunger from the rotational motion of the crank arm such that the plunger can move independently of the crank arm.

3. The agricultural harvesting machine of claim 2, wherein during the run mode, one of the connecting link and the crank arm lengthen and shorten to a second plurality of different lengths to couple the reciprocal motion of the plunger to the rotational motion of the crank arm such that the plunger movement is based upon movement of the crank arm.

4. The agricultural harvesting machine of claim 1, wherein during the startup mode, a plunger brake is engaged to maintain the plunger substantially stationary at any position between and including fully retracted and fully extended.

5. The agricultural harvesting machine of claim 1, wherein one of the connecting link and the crank arm is a double acting cylinder connected to a fluid source by first and second valves.

6. The agricultural harvesting machine of claim 5, wherein the fluid source is placed in a neutral mode and the first and second valves are positioned in a dump mode during the startup mode.

7. The agricultural harvesting machine of claim 1, wherein during the startup mode, the plunger remains substantially stationary in the retracted position.

8. The agricultural harvesting machine of claim 1, wherein the connecting link has a variable length.

9. The agricultural harvesting machine of claim 1, wherein the crank arm has a variable length.

10. The agricultural harvesting machine of claim 1, wherein both the connecting link and the crank arm have variable lengths.

11. An agricultural harvesting machine for crop material comprising:
    a crank arm connected to a rotational power source;
    a plunger having an extended position which is located further rearward in a compression chamber than a retracted position;
    a connecting link connected between the plunger and the crank arm, one of the connecting link and the crank arm having a variable length; and
    a controller configured to decouple the movement of the plunger from the movement of the crank arm during a startup mode, in which a speed of the crank arm is rotating below an operational speed, and to couple the plunger to the crank arm during a run mode, in which the crank arm is rotating at the operational speed.

12. The agricultural harvesting machine of claim 11, wherein during the startup mode, the controller is configured to lengthen and shorten one of the connecting link and the crank arm to a first plurality of different lengths to decouple the reciprocal motion of the plunger from the rotational motion of the crank arm such that the plunger can move independently of the crank arm.

13. The agricultural harvesting machine of claim 12, wherein during the run mode, the controller is configured to lengthen and shorten one of the connecting link and the crank arm to a second plurality of different lengths to couple the reciprocal motion of the plunger to the rotational motion of the crank arm such that the plunger movement is based upon movement of the crank arm.

14. The agricultural harvesting machine of claim 11, wherein during the startup mode, the controller is configured to engage a plunger brake to maintain the plunger substantially stationary in any position between and including fully retracted and fully extended.

15. The agricultural harvesting machine of claim 11, wherein one of the connecting link and the crank arm is a double acting cylinder connected to a fluid source by first and second valves.

16. The agricultural harvesting machine of claim 15, wherein the controller is configured to position the fluid source in a neutral mode and the first and second valves in a dump mode during the startup mode.

17. The agricultural harvesting machine of claim 11, wherein during the startup mode, the controller is configured to maintain the plunger substantially stationary in the retracted position.

18. The agricultural harvesting machine of claim 11, wherein the connecting link has a variable length.

19. The agricultural harvesting machine of claim 11, wherein the crank arm has a variable length.

20. The agricultural harvesting machine of claim 11, wherein both the connecting link and the crank arm have variable lengths.

* * * * *